(12) United States Patent
Kasuya et al.

(10) Patent No.: US 9,428,176 B2
(45) Date of Patent: Aug. 30, 2016

(54) CONTROL DEVICE

(71) Applicant: AISIN AW CO., LTD., Anjo-shi, Aichi-ken (JP)

(72) Inventors: Satoru Kasuya, Nishio (JP); Masashi Kito, Anjo (JP); Shigeru Sugisaka, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 70 days.

(21) Appl. No.: 14/377,573

(22) PCT Filed: Feb. 15, 2013

(86) PCT No.: PCT/JP2013/053710
§ 371 (c)(1),
(2) Date: Aug. 8, 2014

(87) PCT Pub. No.: WO2013/145921
PCT Pub. Date: Oct. 3, 2013

(65) Prior Publication Data
US 2015/0046005 A1 Feb. 12, 2015

(30) Foreign Application Priority Data
Mar. 30, 2012 (JP) .................................. 2012-079732

(51) Int. Cl.
*F16H 61/00* (2006.01)
*B60W 20/00* (2016.01)
(Continued)

(52) U.S. Cl.
CPC ............... *B60W 20/10* (2013.01); *B60K 6/40* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS 6,769,502 B2 * 8/2004 Nakamori ........... F16H 61/0031
180/65.25
7,909,582 B2 * 3/2011 Kumazaki ........... F16H 61/0031
180/65.27
(Continued)

FOREIGN PATENT DOCUMENTS

JP      A-2004-67001        3/2004
JP      2000274267 A  * 10/2008
(Continued)

OTHER PUBLICATIONS

Kaihara Kuniaki, Translation of JP 2000274267, Oct. 3, 2000.*
(Continued)

*Primary Examiner* — Rami Khatib
*Assistant Examiner* — David Merlino
(74) *Attorney, Agent, or Firm* — Oliff PLC

(57) ABSTRACT

A control device that controls a vehicle drive device in which a first rotating electrical machine and a speed change mechanism are provided on a power transmission path connecting an internal combustion engine and wheels. The control device includes a first pump that is driven by the first rotating electrical machine and a second pump that is driven by a second rotating electrical machine provided independently of the power transmission path. The control device is configured with an auxiliary drive control section that, when a main power supply of a vehicle is turned on, executes auxiliary drive control of driving the first pump for a set drive time by the first rotating electrical machine before driving the second pump by the second rotating electrical machine, and starting the second pump after elapse of the set drive time.

6 Claims, 9 Drawing Sheets

(51) Int. Cl.
  *B60K 6/40* (2007.10)
  *B60K 6/547* (2007.10)
  *B60W 10/02* (2006.01)
  *B60W 10/10* (2012.01)
  *B60W 10/30* (2006.01)
  *B60W 10/06* (2006.01)
  *B60W 10/08* (2006.01)
  *B60K 6/48* (2007.10)
  *F16H 59/78* (2006.01)

(52) U.S. Cl.
  CPC .............. *B60W 10/02* (2013.01); *B60W 10/06* (2013.01); *B60W 10/08* (2013.01); *B60W 10/10* (2013.01); *B60W 10/30* (2013.01); *B60W 20/00* (2013.01); *F16H 61/0025* (2013.01); *F16H 61/0031* (2013.01); *B60K 2006/4825* (2013.01); *F16H 59/78* (2013.01); *Y02T 10/6252* (2013.01); *Y10S 903/93* (2013.01)

(56) References Cited

U.S. PATENT DOCUMENTS

| | | | |
|---|---|---|---|
| 2008/0240941 | A1 | 10/2008 | Kumazaki et al. |
| 2009/0071142 | A1* | 3/2009 | Kumazaki ........... F16H 61/0031 60/428 |
| 2009/0232673 | A1* | 9/2009 | Reisch ................ F16H 61/0031 417/364 |

FOREIGN PATENT DOCUMENTS

| | | |
|---|---|---|
| JP | A-2008-255835 | 10/2008 |
| JP | A-2009-52638 | 3/2009 |

OTHER PUBLICATIONS

International Search Report issued in International Patent Application No. PCT/JP2013/053710 dated Mar. 19, 2013.

\* cited by examiner

CONTROL DEVICE

TECHNICAL FIELD

The present invention relates to control devices that control a vehicle drive device including a first pump and a second pump which can be driven independently of each other.

BACKGROUND ART

Vehicle drive devices that include an oil supply portion capable of supplying both oil discharged from the first pump and oil discharged from the second pump to at least a speed change mechanism are known as such a vehicle drive device. For example, Japanese Patent Application Publication No. 2009-52638 (JP 2009-52638 A) (Patent Document 1) discloses a configuration that includes an oil supply portion [hydraulic oil supply device] having a first oil passage [suction passage 17] in which oil to be supplied to the first pump [first oil pump 11] flows and a second oil passage which branches off from the first oil passage and in which oil to be supplied to the second pump [second oil pump 12] flows. This oil supply portion is capable of supplying both oil discharged from the first pump and oil discharged from the second pump to the speed change mechanism [automatic transmission] via a hydraulic control device [hydraulic circuit 20].

The oil supply portion of Patent Document 1 includes an electromagnetic switch valve that switches the relation of connection of the first pump and the second pump between an oil pan and the hydraulic control device to parallel connection or series connection. By switching the position of the electromagnetic switch valve so that the two pumps are connected in parallel, the control device can supply oil discharged from the second pump driven by an electric motor to the hydraulic control device even if driving of the first pump is stopped upon, e.g., idling stop.

If a long time has elapsed since a main power supply of the vehicle was turned off, it is more likely that oil in the oil passages (the first oil passage and the second oil passage) in which oil to be supplied to each pump flows has been returned to the oil pan by its own weight and has been replaced with air. If the main power supply of the vehicle is turned on in this state and the second pump is driven, an oil pressure does not actually start to be generated until the air present in the oil passages has been discharged. Accordingly, oil may be late in being supplied to the speed change mechanism. For example, this problem tends to occur particularly when the oil temperature is low in winter etc., because viscosity resistance of oil is increased. If the oil temperature is lower than a predetermined temperature when the main power supply of the vehicle is turned on, the control device of Patent Document 1 switches the position of the electromagnetic switch valve so that the two pumps are connected in series. Thus, oil discharged from the first pump having higher discharge capability is supplied to the second pump via the electromagnetic switch valve so as to forcibly circulate the low temperature oil in the second pump. Accordingly, oil can be promptly supplied to the speed change mechanism without using a rotating electrical machine having a large physical size as a power source that drives the second pump.

In the technique of Patent Document 1, however, torque of an internal combustion engine needs to be increased so that the second pump can be forcibly driven by the first pump, which reduces fuel economy. Moreover, since the electromagnetic switch valve is required, the cost and size of the vehicle drive device are increased accordingly. Patent Document 1 therefore cannot make good use of advantages that the fuel economy is improved by driving the second pump and that a rotating electrical machine having a relatively small physical size can be used as the power source that drives the second pump.

RELATED ART DOCUMENT

Patent Document

[Patent Document 1] Japanese Patent Application Publication No. 2009-52638 (JP 2009-52638 A)

SUMMARY OF THE INVENTION

Problem to be Solved by the Invention

It is desired to implement a control device that suppresses an increase in cost and size of a vehicle drive device and that is capable of promptly supplying oil to a speed change mechanism when a main power supply of a vehicle is turned on.

Means for Solving the Problem

According to the present invention, a control device that controls a vehicle drive device in which a first rotating electrical machine and a speed change mechanism are provided on a power transmission path connecting an internal combustion engine and wheels, which includes a first pump that is driven by the first rotating electrical machine and a second pump that is driven by a second rotating electrical machine provided independently of the power transmission path, and which further includes an oil supply portion that has a first oil passage in which oil to be supplied to the first pump flows and a second oil passage which branches off from the first oil passage and in which oil to be supplied to the second pump flows, and that is capable of supplying both oil discharged from the first pump and oil discharged from the second pump to at least the speed change mechanism is characterized by including: an auxiliary drive control section that, when a main power supply of a vehicle is turned on, executes auxiliary drive control of driving the first pump for a set drive time by the first rotating electrical machine before driving the second pump by the second rotating electrical machine, and starting the second pump after elapse of the set drive time; and a drive time deciding section that decides, based on capacity of a common oil passage portion as a portion extending from an open end located on an opposite side of the first oil passage from the first pump to a branch point to the second oil passage, the set drive time so that the common oil passage portion and at least part of the second oil passage can be filled with oil.

According to this characteristic configuration, the first pump that is driven by the high output first rotating electrical machine provided on the power transmission path and functioning as a driving force source for the wheels is driven in the auxiliary drive control, whereby air present in the first oil passage can be promptly discharged and replaced with oil. At this time, since the first pump is driven for the set drive time that is decided based on the capacity of the common oil passage portion, the common oil passage portion and at least part of the second oil passage can be filled with oil. Since the time during which the first rotating electrical machine is driven to drive the pump can be reduced to a relatively short time, reduction in fuel economy can be suppressed. After the elapse of the set drive time, at least part of the second oil passage on the first oil passage side is full of oil, and the remaining part on the second pump side where air remains is in a reduced pressure state. This can reduce a load on the second rotating electrical machine upon starting of the second pump. This eliminates the need to use a second rotating electrical machine having a large physical size, and can thus suppress an increase in cost and size of the vehicle drive device. Since air remaining in the second oil passage can be discharged more promptly, oil can be promptly supplied to the speed change mechanism by the second pump. Moreover, since the oil supply portion need not be provided with a special mechanism such as a switch valve, an increase in cost and size of the vehicle drive device can be suppressed in this respect as well.

It is preferable that the drive time deciding section decide the set drive time based also on an oil temperature and a rotational speed of the first rotating electrical machine during the auxiliary drive control.

The rate at which oil in the first oil passage is sucked by driving the first pump depends on discharge capability (suction capability) of the first pump and viscosity resistance of oil. The discharge capability of the first pump depends on the rotational speed of the first rotating electrical machine, and the viscosity resistance of oil depends on the oil temperature. According to the above configuration, an appropriate set drive time according to the rotational speed of the first rotating electrical machine and the oil temperature can be decided, and the common oil passage and at least part of the second oil passage can be appropriately filled with oil by the auxiliary drive control.

It is preferable that in the auxiliary drive control, the auxiliary drive control section stop the first pump after the elapse of the set drive time.

According to this configuration, the first pump is stopped and the second pump is started after the elapse of the set drive time. That is, a power source that drives the pump is switched from the high output first rotating electrical machine to the relatively low output second rotating electrical machine. Thus, oil can be promptly supplied to the speed change mechanism, and reduction in fuel economy can be suppressed.

It is preferable that the control device further include: a mode command accepting section that accepts selection of one of a drive mode in which the vehicle is allowed to travel and a stop mode in which the vehicle is not allowed to travel; and an acceptance prohibition control section that prohibits acceptance of a change from the stop mode to the drive mode until the set drive time elapses.

According to this configuration, acceptance of a mode change from the stop mode to the drive mode is prohibited if the set drive time has not elapsed and thus the auxiliary drive control has not been completed and conditions that oil can be promptly supplied to the speed change mechanism have not been satisfied. This can suppress occurrence of a situation where the vehicle actually cannot be immediately and appropriately caused to travel even though the mode is changed to the drive mode by the driver of the vehicle. This can prevent discomfort from being caused to the driver of the vehicle.

It is preferable that the control device further include: a mode command accepting section that accepts selection of one of a drive mode in which the vehicle is allowed to travel and a stop mode in which the vehicle is not allowed to travel; and an engagement control section that controls an engagement state of a starting engagement device included in the speed change mechanism, and the engagement control section shift the starting engagement device from a disengaged state to a slip engaged state if a change from the stop mode to the drive mode is accepted before the set drive time has elapsed, and shift the starting engagement device to a direct-coupling engaged state after the elapse of the set drive time.

According to this configuration, torque of the high output first rotating electrical machine can be transferred to the wheels by bringing the starting engagement device into the slip engaged state. Thus, intention of the driver of the vehicle is prioritized, and the state where the vehicle can travel can be implemented even if the set drive time has not elapsed and the auxiliary drive control has not been fully completed. After the elapse of the set drive time, the auxiliary drive control has been completed. Accordingly, oil can be appropriately supplied to the speed change mechanism (in this example, the starting engagement device) by the second pump. The starting engagement device is shifted to the direct-coupling engaged state by oil discharged from the second pump, and this state is maintained, whereby the vehicle can be immediately caused to travel according to a subsequent acceleration operation etc.

It is preferable that the auxiliary drive control section decide a target rotational speed of the first rotating electrical machine during the auxiliary drive control based on an estimated amount of heat generation or an estimated temperature of the starting engagement device, and the drive time deciding section change the set drive time according to the target rotational speed.

The rotational speed of the first rotating electrical machine defines a differential rotational speed between two engagement members that are engaged with each other in the starting engagement device. This differential rotational speed affects the amount of heat generation and the temperature of the starting engagement device in the slip engaged state. According to the above configuration, the amount of heat generation or the temperature of the starting engagement device can be kept in a proper range by deciding the target rotational speed of the first rotating electrical machine based on the estimated amount of heat generation or the estimated temperature of the starting engagement device. In this case as well, since the set drive time can be changed to an appropriate time according to the target rotational speed of the first rotating electrical machine, the common oil passage and at least part of the second oil passage can be appropriately filled with oil by the auxiliary drive control. Accordingly, the amount of heat generation or the temperature of the starting engagement device can be maintained in the proper range, and oil can be appropriately supplied to the starting engagement device by the second pump after the elapse of the set drive time.

It is preferable that the auxiliary drive control section execute the auxiliary drive control on a condition that the oil temperature is equal to or lower than a predetermined low temperature determination threshold.

According to this configuration, even in a situation where the oil temperature is equal to or lower than the low temperature determination threshold, the viscosity resistance of oil is high, and thus the load on the second rotating electrical machine may be high, oil can be promptly supplied to the speed change mechanism by the second pump after the elapse of the set drive time.

It is preferable that in a state where the vehicle drive device is mounted on the vehicle, the first oil passage, the second oil passage, and the second oil pump be placed below the first pump in a vertical direction.

According to this configuration, oil sucked through the first oil passage by driving the first pump in the auxiliary drive control can be easily supplied also to the second oil passage. The entire second oil passage from the branch point of the first oil passage to the second pump can be easily filled with oil depending on the placement of the second oil passage and the setting of the set drive time. Accordingly, a time lag from the end of the auxiliary drive control to the actual start of oil supply to the speed change mechanism by the second pump can be significantly reduced.

It is preferable that the drive time deciding section decide the set drive time within a range that is equal to or shorter than a time required to entirely fill the first oil passage and the second oil passage with oil.

According to this configuration, the set drive time is decided within the range of time that is longer than the time required to fill the common oil passage portion with oil and equal to or shorter than the time required to entirely fill the first oil passage and the second oil passage with oil. Accordingly, air present in the common oil passage portion and part of the second oil passage can be promptly discharged and replaced with oil, and the first pump can be prevented from being continuously driven even after the entire first oil passage and the entire second oil passage are filled with oil. Therefore, oil can be promptly supplied to the speed change mechanism, and reduction in fuel economy can be suppressed.

MODES FOR CARRYING OUT THE INVENTION

1. First Embodiment

Figure 1:
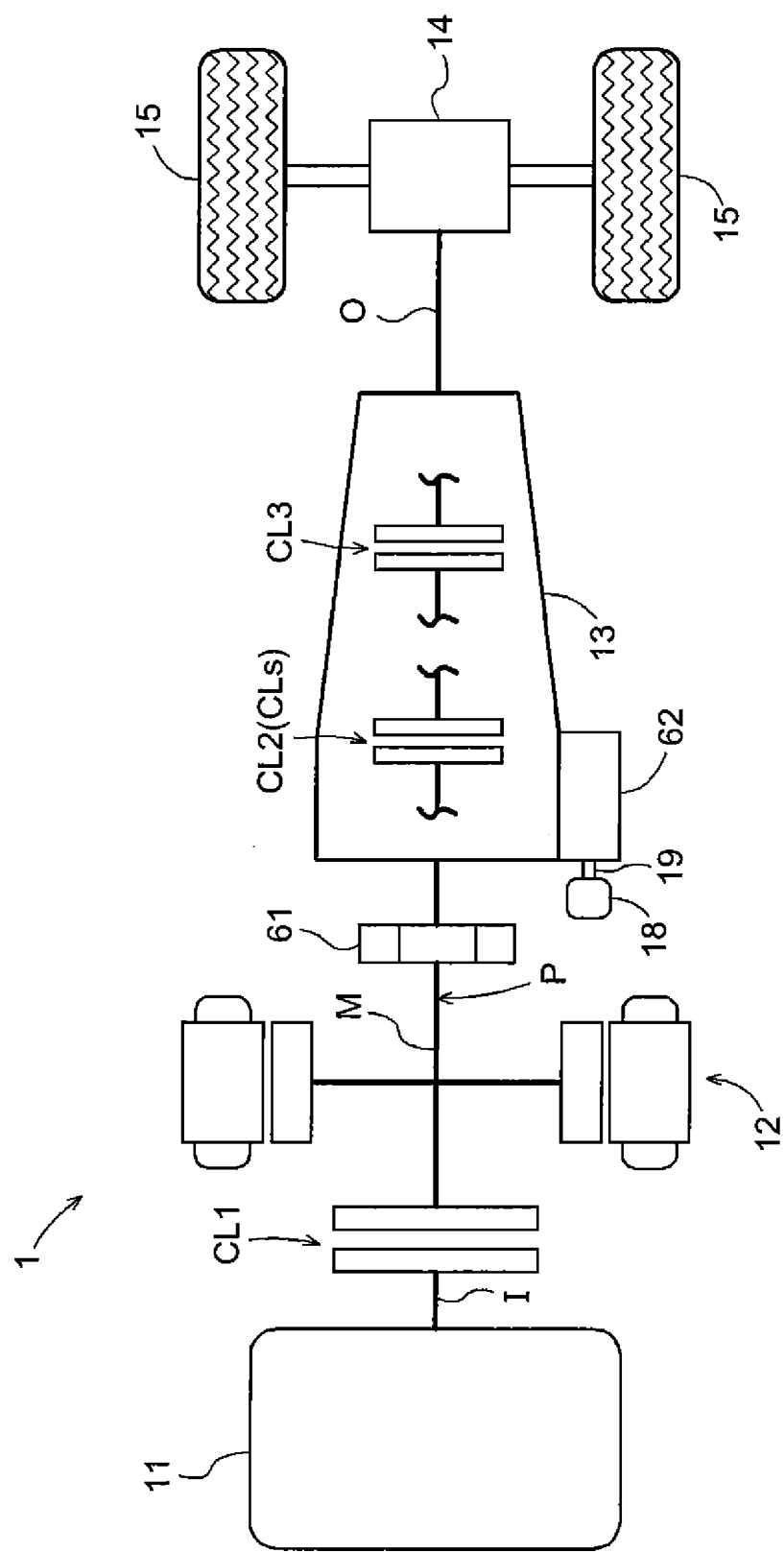
FIG. 1 is a schematic diagram showing a general configuration of a vehicle drive device.

A first embodiment of a control device according to the present invention will be described with reference to the accompanying drawings. A control device 3 according to the present embodiment controls a drive device 1. The drive device 1 is a vehicle drive device (hybrid vehicle drive device) that drives a vehicle (hybrid vehicle) including both an internal combustion engine 11 and a first rotating electrical machine 12 as driving force sources of wheels 15. The control device 3 according to the present embodiment will be described in detail below.

1-1. Configuration of Drive Device

The configuration of the drive device 1 that is controlled by the control device 3 will be described. As shown in FIG. 1, the drive device 1 according to the present embodiment includes the first rotating electrical machine 12 and a speed change mechanism 13 on a power transmission path P connecting the internal combustion engine 11 and the wheels 15. The first rotating electrical machine 12 and the speed change mechanism 13 are provided in this order from the internal combustion engine 11 side. The drive device 1 further includes an oil supply portion 6 (see FIG. 2) having a first pump 61 that is driven by the first rotating electrical machine 12 and a second pump 62 that is driven by a second rotating electrical machine 18 provided independently of the power transmission path P. These components are accommodated in a drive device case (not shown). Part of these components (e.g., the second rotating electrical machine 18, the second pump 62, etc.) may be provided outside the drive device case.

The internal combustion engine 11 is a motor (gasoline engine etc.) that is driven by fuel combustion in the engine to output power. The internal combustion engine 11 is drivingly coupled to an input shaft I as an input member of the drive device 1. In this example, an internal-combustion-engine output shaft such as a crankshaft of the internal combustion engine 11 is drivingly coupled to the input shaft I so as to rotate together therewith. The internal combustion engine 11 is drivingly coupled to the first rotating electrical machine 12 via a first engagement device CL1. The expression "drivingly coupled" means the state where two rotating members are coupled together so as to be able to transmit a driving force (synonymous with "torque") therebetween. This concept includes the state where the two rotating members are coupled together so as to rotate together, the state where the two rotating members are coupled together so as to be able to transmit a driving force therebetween via one or more transmission members (a shaft, a gear mechanism, a belt, etc.), etc.

The first engagement device CL1 is an engagement device that selectively drivingly couples the internal combustion engine 11 and the first rotating electrical machine 12. The first engagement device CL1 is capable of releasing the drivingly coupled state between the internal combustion engine 11 and the first rotating electrical machine 12 when in a disengaged state. The first engagement device CL1 functions as an internal combustion engine separating engagement device that separates the internal combustion engine 11 from the wheels 15, the first rotating electrical machine 12, etc. The first engagement device CL1 is configured as a friction engagement device (a wet multi-plate clutch, a dry single-plate clutch, etc.) capable of transferring torque by a friction force that is generated between engagement members engaged with each other.

The first rotating electrical machine 12 has a rotor and a stator, and is capable of functioning both as a motor (electric motor) and as a generator (electric generator). The rotor of the first rotating electrical machine 12 is drivingly coupled to an intermediate shaft M so as to rotate together therewith. The first rotating electrical machine 12 is electrically connected to an electricity storage device 25 (a battery, a capacitor, etc.) via an inverter device 24 (see FIG. 4). The first rotating electrical machine 12 is supplied with electric power from the electricity storage device 25 to perform power running, or supplies electric power generated by torque of the internal combustion engine 11, etc. to the electricity storage device 25 to store the electric power therein. The intermediate shaft M is drivingly coupled to a pump rotor of the first pump 61 so as to rotate together therewith, and is drivingly coupled to the speed change mechanism 13.

In the present embodiment, the speed change mechanism 13 is an automatic stepped speed change mechanism having a plurality of switchable shift speeds with different speed ratios (gear ratios). In order to form the plurality of shift speeds, the speed change mechanism 13 includes a gear mechanism and a plurality of engagement devices (shift engagement devices) that engage or disengage rotating elements of the gear mechanism. Each of these engagement devices is configured as a friction engagement device capable of transferring torque by a friction force that is generated between engagement members engaged with each other. Wet multi-plate clutches (including brakes) etc. can be used as the engagement devices. The engagement devices of the speed change mechanism 13 include a second engagement device CL2, a third engagement device CL3, . . . . In the present embodiment, the speed change mechanism 13 forms a target shift speed at each point of time by bringing specific two of the plurality of engagement devices into a direct-coupling engaged state and bringing the remainder into a disengaged state. The speed change mechanism 13 may form a target shift speed by bringing a specific one or specific three or more of the plurality of engagement devices into the direct-coupling engaged state. The speed change mechanism 13 is thus capable of switching between or among the plurality of shift speeds by controlling the engagement state of each of the plurality of shift engagement devices.

The speed change mechanism 13 changes the rotational speed from the intermediate shaft M based on the speed ratio that has been set for the shift speed to be formed, and transmits the shifted rotational speed to an output shaft O. As used herein, the "speed ratio" is a ratio of the rotational speed of the intermediate shaft M to the rotational speed of the output shaft O as an output-side rotating member of the speed change mechanism 13. The output shaft O that also serves as an output member of the drive device 1 is drivingly coupled to the right and left two wheels 15 via a differential gear unit 14. Torque transferred to the output shaft O is distributed and transferred to the two wheels 15 by the differential gear unit 14. The drive device 1 can thus transfer the torque of one or both of the internal combustion engine 11 and the first rotating electrical machine 12 to the wheels 15 to cause the vehicle to travel.

The second rotating electrical machine 18 provided independently of the power transmission path P has a rotor and a stator, and is capable of functioning as a motor (electric motor). The rotor of the second rotating electrical machine 18 is drivingly coupled to a pump rotor of the second pump 62 so as to rotate together therewith. The second rotating electrical machine 18 is electrically connected to the electricity storage device 25 (see FIG. 4). The second rotating electrical machine 18 is supplied with electric power from the electricity storage device 25 to perform power running, and drives the second pump 62.

1-2. Configuration of Oil Supply Portion

Figure 2:
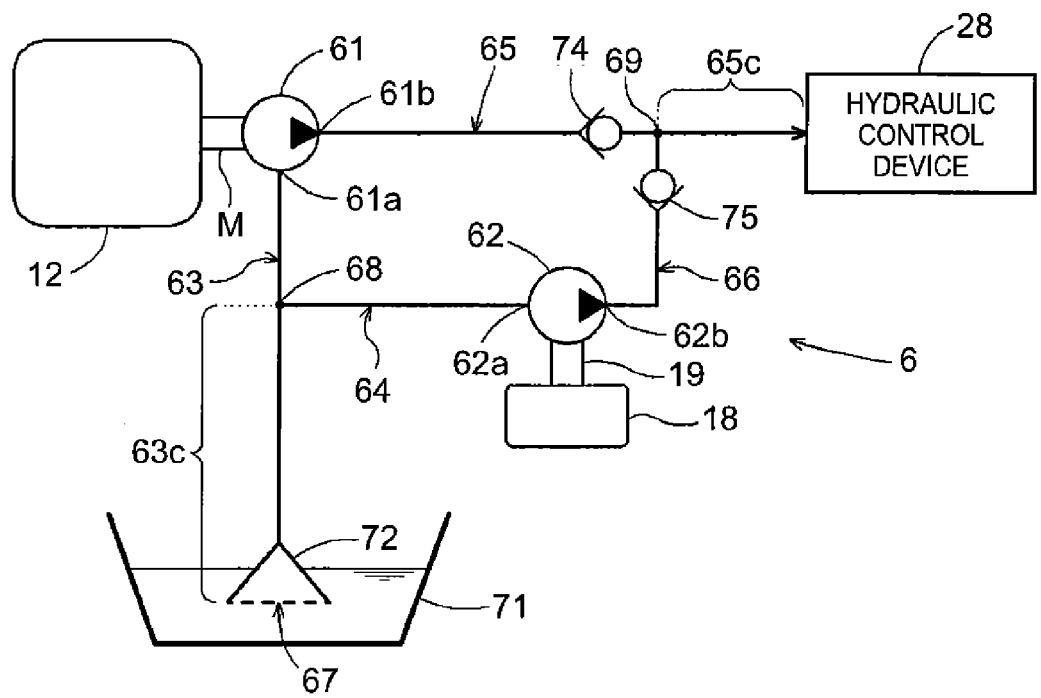
FIG. 2 is a hydraulic circuit diagram showing a general configuration of an oil supply portion.

The configuration of the oil supply portion 6 included in the drive device 1 will be described. As shown in FIG. 2, the oil supply portion 6 includes the first pump 61 and the second pump 62 as oil pressure generation sources, and includes a first oil passage 63, a second oil passage 64, a third oil passage 65, and a fourth oil passage 66 as oil flow passages. The first pump 61 and the second pump 62 are connected in parallel between an oil reservoir portion 71 (so-called oil pan) configured as an oil sump at the bottom of the drive device case and a hydraulic control device 28. The first pump 61 and the second pump 62 are capable of sucking oil from the oil reservoir portion 71 and discharging the oil independently of each other. The oil supply portion 6 is thus capable of supplying both the oil discharged from the first pump 61 and the oil discharged from the second pump 62 to the speed change mechanism 13 via the hydraulic control device 28.

In the present embodiment, the first pump 61 is configured as an internal gear pump. The pump rotor of the first pump 61 is drivingly coupled via the intermediate shaft M to the rotor of the first rotating electrical machine 12 so as to rotate together therewith. The first pump 61 is thus driven by the first rotating electrical machine 12. The first pump 61 that is driven by the high-output first rotating electrical machine 12 that can function as a driving force source for the wheels 15 during normal traveling of the vehicle is a pump having higher discharge capability than the second pump 62.

In the present embodiment, the second pump 62 is configured as an internal gear pump. The pump rotor of the second pump 62 is drivingly coupled via a drive shaft 19 to the rotor of the second rotating electrical machine 18 so as to rotate together therewith. The second pump 62 is thus driven by the second rotating electrical machine 18. The second pump 62 mainly functions as an auxiliary pump that discharges oil instead of the first pump 61 to generate an oil pressure when the first pump 61 (first rotating electrical machine 12) is stopped. A pump having lower discharge capability than the first pump 61 is therefore used as the second pump 62. The discharge capability of the second pump 62 is set to, e.g., $\frac{1}{5}$ to $\frac{1}{3}$ of the discharge capability of the first pump 61. This setting allows the relatively small second pump 62 to be used, and allows the relatively small second rotating electrical machine 18 to be used as a power source for the second pump 62.

The first pump 61 and the second pump 62 may be external gear pumps, trochoid pumps, vane pumps, etc.

The first oil passage 63 communicating with the oil reservoir portion 71 is connected to a suction port 61a of the first pump 61. An oil suction port 72 is provided on the opposite side of the first oil passage 63 from the first pump 61 (suction port 61a). The oil suction port 72 contains a screen (filter) that filters out foreign matter and dirt from the oil, and functions as a so-called strainer. In the present embodiment, the end on the oil reservoir portion 71 side of the oil suction port 72 serves as an open end 67 of the first oil passage 63. The oil stored in the oil reservoir portion 71 is sucked from the oil suction port 72, flows in the first oil passage 63, and is supplied to the first pump 61.

The second oil passage 64 communicating with the first oil passage 63 is connected to a suction port 62a of the second pump 62. In other words, the second oil passage 64 is formed so as to branch off from the first oil passage 63 and to be connected to the second pump 62. Part of the oil sucked from the oil reservoir portion 71 via the oil suction port 72 and flowing in the first oil passage 63 flows into the second oil passage 64 from a branch point 68 between the first oil passage 63 and the second oil passage 64, and is supplied to the second pump 62.

The oil supply portion 6 thus has a common supply oil passage (common oil passage portion 63c) for the first pump 61 and the second pump 62. In the present embodiment, the common oil passage portion 63c is a part of the first oil passage 63 which extends from the open end 67 on the oil suction port 72 side to the branch point 68 to the second oil passage 64. The oil sucked through the common oil passage portion 63c of the first oil passage 63 is supplied as it is to the first pump 61 through the first oil passage 63 and/or is supplied to the second pump 62 through the second oil passage 64, according to the drive state of each pump 61, 62.

The third oil passage 65 communicating with the hydraulic control device 28 is connected to a discharge port 61b of the first pump 61. The oil discharged from the first pump 61 flows in the third oil passage 65 and is supplied to the hydraulic control device 28. The fourth oil passage 66 communicating with the third oil passage 65 is connected to a discharge port 62b of the second pump 62. The oil discharged from the second pump 62 flows in the fourth oil passage 66 and into the third oil passage 65 from a junction 69 of the third oil passage 65 and the fourth oil passage 66, and is supplied to the hydraulic control device 28. The oil supply portion 6 has a second common oil passage portion 65c as a part of the third oil passage 65 which extends from the junction 69 with the fourth oil passage 66 to a connection end to the hydraulic control device 28.

The oil supply portion 6 is thus capable of supplying the oil stored in the oil reservoir portion 71 to the hydraulic control device 28 via the first oil passage 63 and the third oil passage 65 by driving the first pump 61 by the first rotating electrical machine 12. The oil supply portion 6 is also capable of supplying the oil stored in the oil reservoir portion 71 to the hydraulic control device 28 via the oil passages 63 (63c), 64, 66, 65 (65c) by driving the second pump 62 by the second rotating electrical machine 18. The oil supplied to the hydraulic control device 28 is supplied to each engagement device CL1, C12, CL3, . . . after being adjusted to a predetermined oil pressure (see FIG. 4).

A first check valve 74 is provided upstream of the junction 69 in the third oil passage 65. The first check valve 74 allows oil to flow only toward the junction 69, and restricts oil flow in the opposite direction, namely toward the first pump 61. A second check valve 75 is provided in the fourth oil passage 66. The second check valve 75 allows oil to flow only toward the junction 69, and restricts oil flow in the opposite direction, namely toward the second pump 62. This prevents the oil discharged from the first pump 61 from flowing from the junction 69 toward the second pump 62, and prevents the oil discharged from the second pump 62 from flowing from the junction 69 toward the first pump 61. This enhances oil supply efficiency of the first pump 61 and the second pump 62.

Figure 3:
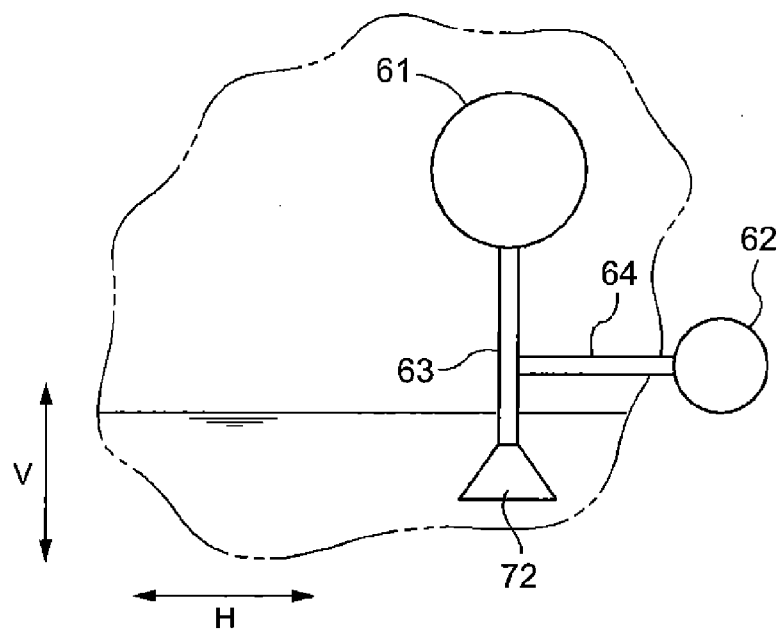
FIG. 3 is a schematic diagram showing arrangement in the oil supply portion.

As shown in FIG. 3, in the state where the drive device 1 is mounted on the vehicle, the first oil passage 63, the second oil passage 64, and the second pump 62 which form the oil supply portion 6 are placed below the first pump 61 in a vertical direction V. In the present embodiment, the first oil passage 63 is formed so as to extend at least downward in the vertical direction V from the first pump 61. In the illustrated example, the second oil passage 64 is formed so as to extend in a horizontal direction H from the first oil passage 63. The second oil passage 64 and the second pump 62 are placed above the level of the oil stored in the oil reservoir portion 71 in the vertical direction V. The second oil passage 64 may be formed so as to extend from the first oil passage 63 obliquely with respect to the horizontal direction H. The second oil passage 64 need only be entirely placed below the suction port 61a of the first pump 61 in the vertical direction V.

1-3. Configuration of Control Device

Figure 4:
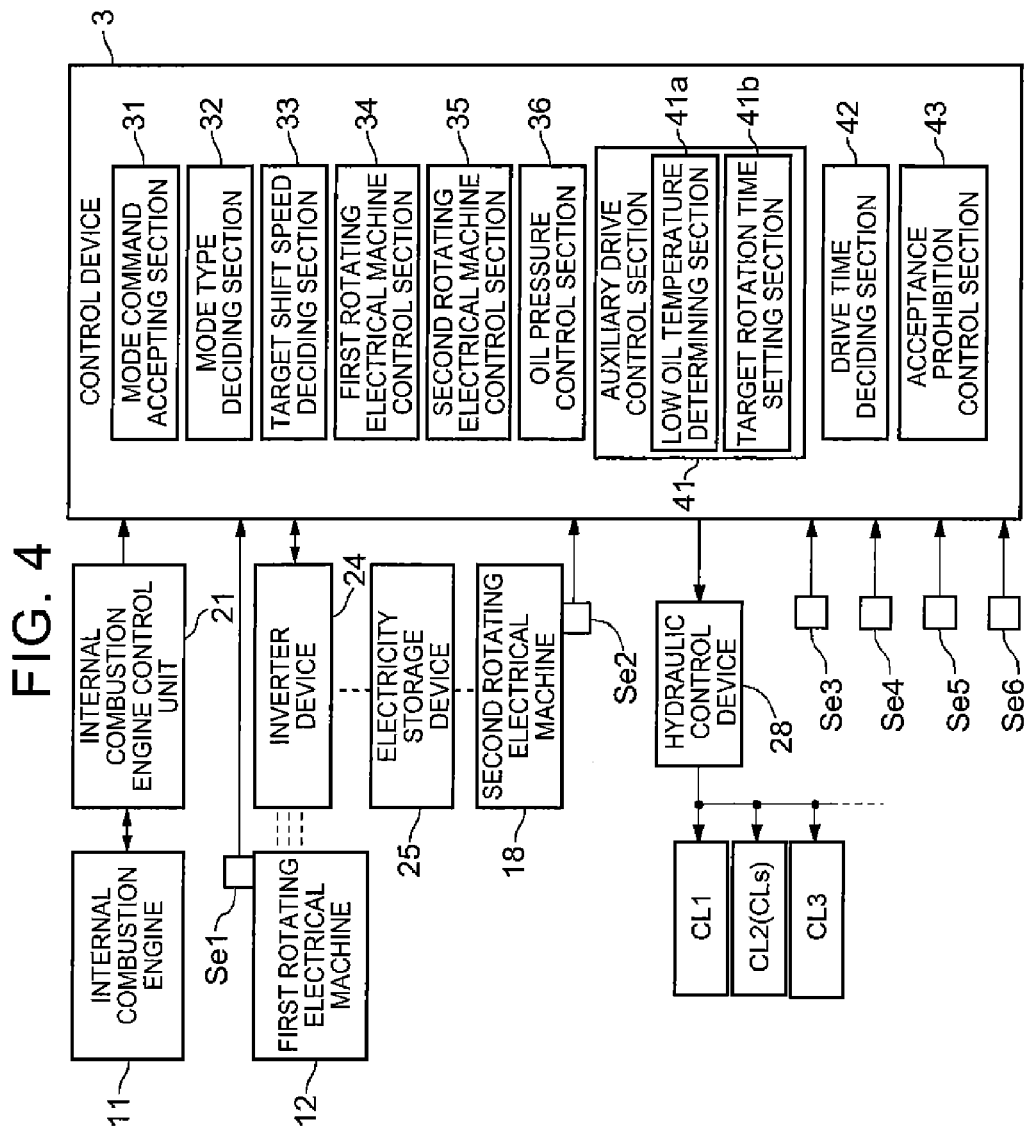
FIG. 4 is a block diagram showing a general configuration of a control device.

The configuration of the control device 3 according to the present embodiment will be described. As shown in FIG. 4, the control device 3 according to the present embodiment includes a plurality of function units, and mainly controls the first rotating electrical machine 12, the second rotating electrical machine 18, the first engagement device CL1, and the shift engagement devices (the second engagement device CL2, the third engagement device CL3, . . . ). The plurality of function units are capable of receiving and sending information from and to each other. The control device 3 is also capable of receiving and sending information from and to an internal combustion engine control unit 21 that controls the internal combustion engine 11. The control device 3 is capable of obtaining information on the detection results of sensors Se1 to Se6 provided in each part of the vehicle.

The first rotation sensor Se1 is a sensor that detects the rotational speed of the rotor of the first rotating electrical machine 12 (the intermediate shaft M). The second rotation sensor Se2 is a sensor that detects the rotational speed of the rotor of the second rotating electrical machine 18. The third rotation sensor Se3 is a sensor that detects the rotational speed of the output shaft O. The control device 3 is capable of deriving the rotational speed of the wheels 15 and the vehicle speed based on the detection result of the third rotation sensor Se3. The main power supply sensor Se4 is a sensor that detects if a main power supply of the vehicle is on or off. The oil temperature sensor Se5 is a sensor that detects the temperature of oil (oil temperature) stored in the oil reservoir portion 71. The lever position sensor Se6 is a sensor that detects the position of a shift lever (not shown). In addition to these sensors, various sensors that are normally provided in hybrid vehicles are provided such as, e.g., a sensor that detects the rotational speed of the internal combustion engine 11 (the input shaft I), a sensor that detects the accelerator operation amount, and a sensor that detects the state of charge (SOC).

The internal combustion engine control unit 21 controls the internal combustion engine 11. The internal combustion engine control unit 21 decides target torque and a target rotational speed of the internal combustion engine 11 based on a requested driving force decided based on the vehicle speed and the accelerator operation amount. The internal combustion engine control unit 21 controls operation of the internal combustion engine 11 according to these control targets.

In the present embodiment, the internal combustion engine control unit 21 executes warm-up operation control if the oil temperature is in a predetermined warm-up required temperature range. The internal combustion engine control unit 21 determines that the oil temperature is in the warm-up required temperature range on the condition that the oil temperature is equal to or lower than a predetermined warm-up determination threshold WT, and executes the warm-up operation control. The warm-up operation control is the control of driving the internal combustion engine 11 at a low rotational speed and a low load so as to facilitate coordination between or among components in the internal combustion engine 11 and to ensure smooth, reliable operation of each part. This warm-up operation control can increase the internal temperature of the internal combustion engine 11, supply lubricating oil to each part, and keep proper clearance between the components so that each part can provide its intended performance. In the present embodiment, the warm-up operation control is executed with the first engagement device CL1 being in the disengaged state. The warm-up determination threshold WT is set based on the oil temperature during cold operation. For example, the oil temperature during cold operation is experimentally obtained in advance, and the warm-up determination threshold WT can be set to the sum of the experimentally obtained oil temperature and a predetermined margin (the oil temperature higher than the experimentally obtained oil temperature). The warm-up determination threshold WT may be different depending on the region.

A mode command accepting section 31 is a function unit that accepts selection of either a drive mode or a stop mode. As used herein, the "drive mode" is a mode in which the vehicle is allowed to travel, and the "stop mode" is a mode in which the vehicle is not allowed to travel. The mode command accepting section 31 accepts selection of the mode based on the position of the shift lever which is detected by the lever position sensor Se6. In the present embodiment, one of a parking position (P-range position), a neutral position (N-range position), a forward travel position (e.g., D-range position), and a reverse travel position (e.g., R-range position) can be selected as the position of the shift lever. In the present embodiment, the mode command accepting section 31 accepts selection of the stop mode when the shift lever is at the stop position or the neutral position. The mode command accepting section 31 accepts selection of the drive mode when the shift lever is at the forward travel position or the reverse travel position.

A mode type deciding section 32 is a function unit that decides a mode type in the drive mode when selection of the drive mode is accepted. The mode type deciding section 32 refers to, e.g., a mode selection map (not shown) and decides the mode type to be implemented by the drive device 1, based on the vehicle speed, the accelerator operation amount, the amount of electricity stored in the electricity storage device 25 (SOC), etc. In the present embodiment, the mode types that can be selected by the mode type deciding section 32 include an electric drive mode (EV mode) and a hybrid drive mode (HEV mode). In the electric drive mode, the first engagement device CL1 is brought into the disengaged state, and the torque of the first rotating electrical machine 12 is transferred to the wheels 15 to cause the vehicle to travel. In the hybrid drive mode, the first engagement device CL1 is brought into the direct-coupling engaged state, and the torque of both the internal combustion engine 11 and the first rotating electrical machine 12 is transferred to the wheels 15 to cause the vehicle to travel. The present embodiment may be configured so that drive modes other than the above drive modes can be selected. In the present embodiment, the mode type deciding section 32 decides the electric drive mode as the mode type when the vehicle is started from the stopped state.

A target shift speed deciding section 33 is a function unit that decides a target shift speed. The target shift speed deciding section 33 refers to, e.g., a shift map (not shown) and decides a target shift speed to be formed by the speed change mechanism 13, based on the vehicle speed, the accelerator operation amount, etc. In the present embodiment, the target shift speed deciding section 33 decides a first speed as the target shift speed when the vehicle is started from the stopped state.

A first rotating electrical machine control section 34 is a function unit that controls the first rotating electrical machine 12. The first rotating electrical machine control section 34 decides target torque and a target rotational speed of the first rotating electrical machine 12 based on the requested driving force decided based on the vehicle speed and the accelerator operation amount. The first rotating electrical machine control section 34 controls operation of the first rotating electrical machine 12 according to these control targets.

A second rotating electrical machine control section 35 is a function unit that controls the second rotating electrical machine 18. The second rotating electrical machine control section 35 decides a target rotational speed of the second rotating electrical machine 18 that drives the second pump 62, and controls operation of the second rotating electrical machine 18 according to this control target.

An oil pressure control section 36 is a function unit that controls supply of an oil pressure to each engagement device CL1, CL2, CL3, . . . . The oil pressure control section 36 outputs an oil pressure command for each engagement device according to the decided mode type, target shift speed, etc., and controls an oil pressure to be supplied to each engagement device by the hydraulic control device 28. The oil pressure control section 36 is capable of continuously controlling the oil pressure to be supplied to each engagement device by a proportional solenoid etc. according to the oil pressure command. The oil pressure control section 36 thus continuously controls an increase or decrease in engagement pressure of each engagement device to control the engagement state of each engagement device. For example, the oil pressure control section 36 brings an intended one of the engagement devices (intended engagement device) into the disengaged state by controlling the oil pressure to be supplied to the intended engagement device to a value lower than a disengagement boundary pressure. The oil pressure control section 36 brings an intended engagement device into the direct-coupling engaged state by controlling the oil pressure to be supplied to the intended engagement device to a value equal to or higher than an engagement boundary pressure. The oil pressure control section 36 brings an intended engagement device into a slip engaged state by controlling the oil pressure to be supplied to the intended engagement device to a slip engagement pressure that is equal to or higher than the disengagement boundary pressure and lower than the engagement boundary pressure.

The "disengaged state" means the state where neither rotation nor torque is transferred between two engagement members that are engaged by the intended engagement device. The "direct-coupling engaged state" means the state where the two engagement members are engaged so as to rotate together. The "slip engaged state" means the state where the two engagement members are engaged with differential rotation therebetween so as to be able to transfer torque therebetween. When the intended engagement device is in the slip engaged state, the two engagement members rotate relative to each other, and torque is transferred from the engagement member having a higher rotational speed toward the other engagement member having a lower rotational speed.

In the present embodiment, the oil pressure control section 36 controls the oil pressure to be supplied to the first engagement device CL1 according to the decided mode type. The oil pressure control section 36 controls the oil pressure to be supplied to each shift engagement device CL2, CL3, . . . according to the decided target shift speed. At this time, in the present embodiment, the oil pressure control section 36 controls the oil pressure to be supplied to each engagement device so as to bring specific two of the plurality of engagement devices according to the target shift speed into the direct-coupling engaged state. The oil pressure control section 36 controls the oil pressure to be supplied to each engagement device to control the engagement state thereof, thereby switching the shift speed to be implemented by the speed change mechanism 13. In the present embodiment, the oil pressure control section 36 corresponds to the "engagement control section" in the present invention.

In the present embodiment, the first speed is formed with the second engagement device CL2 and the third engagement device CL3 being in the direct-coupling engaged state. In the present embodiment, the second engagement device CL2 and the third engagement device CL3 are so-called normally open engagement devices that are in the disengaged state when no oil pressure is supplied thereto. The third engagement device CL3 is provided with a so-called one-way clutch that allows a rotating member coupled thereto to rotate only in one direction. When the vehicle is started, the first speed is formed with the second engagement device CL2 being in the direct-coupling engaged state and the one-way clutch being in a fixed state. Then, the third engagement device CL3 is brought into the direct-coupling engaged state. In the present embodiment, one of the second engagement device CL2 and the third engagement device CL3 for forming the first speed for starting of the vehicle, which is not an alternative to the one-way clutch, namely the second engagement device CL2, is referred to as the "starting engagement device CLs."

In order to improve fuel economy etc., the present embodiment is designed so that the internal combustion engine 11 and the first rotating electrical machine 12 are stopped when the vehicle is stopped. In this case, the first pump 61 is also stopped as the first rotating electrical machine 12 is stopped. Accordingly, each engagement device (in this example, particularly the starting engagement device CLs) included in the speed change mechanism 13 cannot be kept in the direct-coupling engaged state. Therefore, as is conventionally known, the second pump 62 is basically driven by the second rotating electrical machine 18 while the first rotating electrical machine 12 is in the stopped state, and the oil adjusted to the predetermined oil pressure by the hydraulic control device 28 is supplied to the starting engagement device CLs. Thus, even when the vehicle is in the stopped state, the direct-coupling engaged state of the starting engagement device CLs is implemented by the oil supplied from the second pump 62, whereby the first speed for starting of the vehicle is formed.

However, if a long time has passed since the main power supply of the vehicle was turned off, it is more likely that the oil in the oil passages (the first oil passage 63 and the second oil passage 64) located upstream of the pumps 61, 62 in the oil supply portion 6 has been returned to the oil reservoir portion 71 by its own weight and has been replaced with air. If the main power supply of the vehicle is turned on in this state and the second pump 62 is driven, an oil pressure does not actually start to be generated until the air present in the first oil passage 63 and the second oil passage 64 has been discharged. Accordingly, the starting engagement device CLs may be late in being actually brought into the direct-coupling engaged state. Such delay of the transition of the starting engagement device CLs to the direct-coupling engaged state is not preferable as it leads to delay in starting of the vehicle, an insufficient driving force, etc. The control device 3 according to the present embodiment therefore has a function that allows oil to be promptly supplied to the starting engagement device CLs even if a long time has passed since the main power supply of the vehicle was turned off. Such a function is implemented mainly by an auxiliary drive control section 41 and a drive time deciding section 42.

The auxiliary drive control section 41 is a function unit that executes auxiliary drive control when the main power supply of the vehicle is turned on. Whether the main power supply of the vehicle is on or off can be detected by the main power supply sensor Se4. The auxiliary drive control is executed on the condition that the main power supply of the vehicle is switched from off to on. This is because air is more likely to have entered the first oil passage 63 and the second oil passage 64 while the main power supply of the vehicle is off. In the present embodiment, in the case where the main power supply of the vehicle is turned on, the auxiliary drive control section 41 executes the auxiliary drive control without taking into consideration the time during which the main power supply of the vehicle had been off.

The auxiliary drive control section 41 executes the auxiliary drive control when the oil temperature is in a predetermined low temperature range. The auxiliary drive control section 41 determines that the oil temperature is in the low temperature range on the condition that the oil temperature is equal to or lower than a predetermined low temperature determination threshold LT, and executes the auxiliary drive control. The auxiliary drive control section 41 thus includes a low oil temperature determining section 41a, and the low oil temperature determining section 41a determines whether or not the oil temperature detected by the oil temperature sensor Se5 is equal to or lower than the predetermined low temperature determination threshold LT (low oil temperature determination). It is preferable that the oil temperature sensor Se5 is installed at a position which is located at least upstream of each pump 61, 62 and where the oil is actually present, such as, e.g., on the bottom of the oil reservoir portion 71. The low temperature determination threshold LT is set to such an oil temperature that viscosity resistance at the time the main power supply is off is significantly high in comparison with that at the time the vehicle is normally driven. For example, the oil temperatures at the time the main power supply is off in summer and winter can be experimentally obtained, and the low temperature determination threshold LT can be set to any intermediate oil temperature therebetween. The low temperature determination threshold LT may be different depending on the region.

In the present embodiment, the low temperature determination threshold LT is set to a value higher than the warm-up determination threshold WT that is used as a reference to execute the warm-up operation control by the internal combustion engine 11. In the case where the low temperature determination threshold LT is set in this manner, the auxiliary drive control is also required in every situation where the warm-up operation control is required. On the other hand, there may be situations where the auxiliary drive control is required even though the warm-up operation control is not required.

In the auxiliary drive control, the auxiliary drive control section 41 drives the first pump 61 by the first rotating electrical machine 12 for a set drive time TD before driving the second pump 62 by the second rotating electrical machine 18. According to the normal specification, the auxiliary drive control section 41 is supposed to immediately drive the second pump 62 by the second rotating electrical machine 18, but instead, the auxiliary drive control section 41 first drives the first pump 61 by the first rotating electrical machine 12 before driving the second pump 62 by the second rotating electrical machine 18. In the present embodiment, "the auxiliary drive control section 41 drives the first rotating electrical machine 12" or "the auxiliary drive control section 41 drives the first pump 61" means that the auxiliary drive control section 41 outputs a command to drive the first rotating electrical machine 12 to the first rotating electrical machine control section 34. Similarly, "the auxiliary drive control section 41 drives the second rotating electrical machine 18" or "the auxiliary drive control section 41 drives the second pump 62" means that the auxiliary drive control section 41 outputs a command to drive the second rotating electrical machine 18 to the second rotating electrical machine control section 35.

The rotational speed of the first rotating electrical machine 12 during execution of the auxiliary drive control is controlled so as to follow a first target rotational speed that is set by a target rotational speed setting section 41b. The target rotational speed setting section 41b sets the first target rotational speed in view of output characteristics of the first rotating electrical machine 12, quietness before starting of the vehicle at the time the main power supply of the vehicle is turned on, etc. The target rotational speed setting section 41b sets the first target rotational speed to, e.g., a rotational speed range according to the torque that can be output from the first rotating electrical machine 12 under low temperature conditions. The target rotational speed setting section 41b also sets the first target rotational speed to, e.g., such a rotational speed range that occupants of the vehicle hardly perceive operating noise while the first rotating electrical machine 12 is being driven. In the present embodiment, the target rotational speed setting section 41b sets the first target rotational speed to a fixed value included in both of the rotational speed ranges.

The auxiliary drive control section 41 drives the first rotating electrical machine 12 at the set first target rotational speed to drive the first pump 61. Meanwhile, the auxiliary drive control section 41 measures the time that has elapsed since starting of the first pump 61 by, e.g., a timer contained in the control device 3, etc. The auxiliary drive control section 41 drives the first pump 61 until the elapsed time reaches the set drive time TD.

In the present embodiment, the set drive time TD as an execution time of the auxiliary drive control is decided by the drive time deciding section 42. The drive time deciding section 42 decides the set drive time TD based on the capacity of the common oil passage portion 63c in the first oil passage 63. The drive time deciding section 42 decides the set drive time TD based also on the rotational speed of the first rotating electrical machine 12 during the auxiliary drive control (the first target rotational speed that is set by the target rotational speed setting section 41b). Moreover, the drive time deciding section 42 decides the set drive time TD based also on the oil temperature.

The maximum value of the volume of air that can enter a passage located upstream of the second pump 62 while the vehicle is in the stopped state is equal to the sum of the capacity of the common oil passage portion 63c in the first oil passage 63 and the capacity of the second oil passage 64. The volume of part of this air which can be directly replaced with oil by driving the first pump 61 corresponds to the capacity of the common oil passage portion 63c. In the configuration in which the second oil passage 64 is placed below the first pump 61 in the vertical direction V as in the present embodiment, air corresponding to the capacity of at least part of the second oil passage 64 can also be easily replaced with oil. In view of these, the drive time deciding section 42 decides the set drive time TD so that the common oil passage portion 63c and at least part of the second oil passage 64 can be filled with oil. That is, the set drive time TD is decided as a time required to fill the common oil passage portion 63c and at least part of the second oil passage 64 with oil.

In the present embodiment, a reference capacity is set as target volume of air to be replaced with oil. The reference capacity is set to a value that is equal to or larger than the capacity of the common oil passage portion 63c and is equal to or smaller than the sum of the capacity of the common oil passage portion 63c and the capacity of the second oil passage 64. In this example, the reference capacity is set to, e.g., the sum of the capacity of the common oil passage portion 63c and the capacity of the second oil passage 64. The drive time deciding section 42 decides the set drive time TD based on the set reference capacity and the rate at which oil in the first oil passage 63 is sucked by driving the first pump 61.

Figure 5:
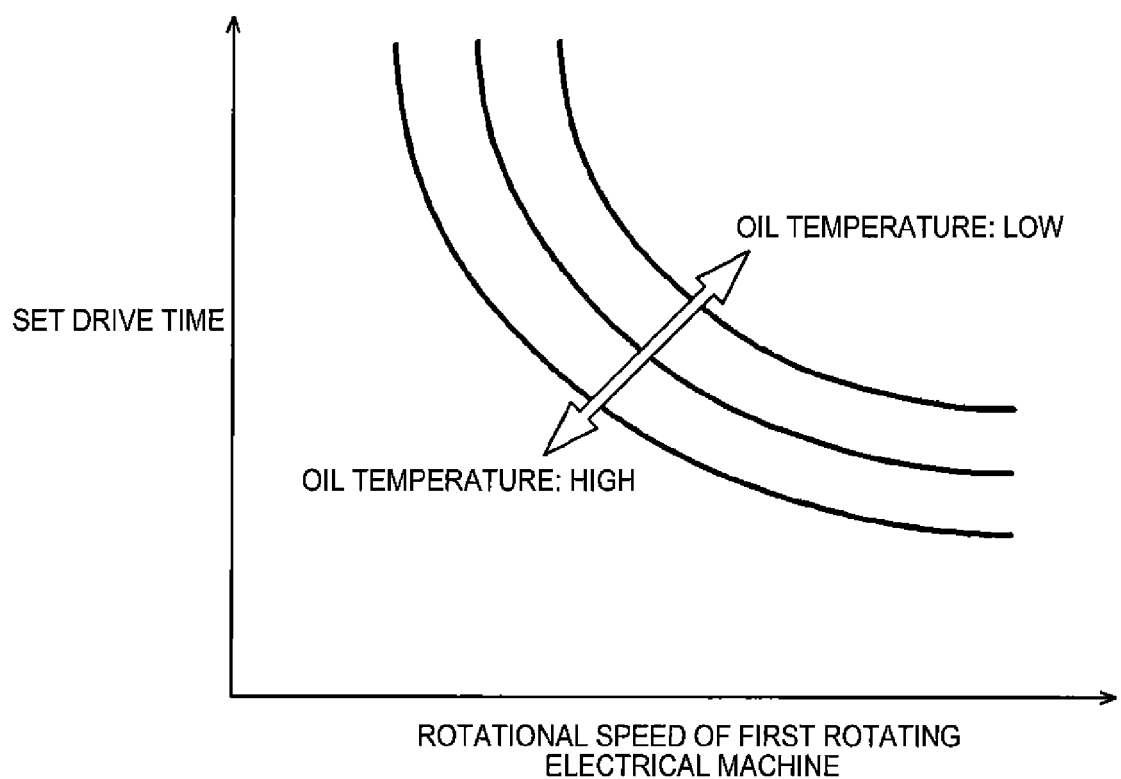
FIG. 5 is a schematic diagram showing an example of a set drive time defining map.

The rate at which oil in the first oil passage 63 is sucked by driving the first pump 61 depends on the discharge capability (suction capability) of the first pump 61 and the viscosity resistance of oil. The discharge capability of the first pump 61 depends on the rotational speed of the first rotating electrical machine 12, and the viscosity resistance of oil depends on the oil temperature. In the present embodiment, the control device 3 has stored therein a set drive time defining map that is set in view of these with respect to a specific reference capacity (see FIG. 5). According to the map of FIG. 5, the set drive time TD is determined in inverse proportion to the rotational speed of the first rotating electrical machine 12 under the same oil temperature conditions. If the rotational speed of the first rotating electrical machine 12 is the same, the set drive time TD increases as the oil temperature decreases.

Based on the rotational speed of the first rotating electrical machine 12 (the first target rotational speed that is set by the target rotational speed setting section 41b) and the oil temperature that is detected by the oil temperature sensor Se5, the drive time deciding section 42 decides the set drive time TD by referring to the set drive time defining map. The maximum value of the set drive time TD is set to the time required to entirely fill the first oil passage 63 and the second oil passage 64 with oil (required fill time). That is, the drive time deciding section 42 decides the set drive time TD within the range that is equal to or shorter than the time required to entirely fill the first oil passage 63 and the second oil passage 64 with oil (required fill time). The drive time deciding section 42 thus decides the set drive time TD in the range that is longer than the time required to fill the common oil passage portion 63c with oil and equal to or shorter than the time required to fill the entire first oil passage 63 and the entire second oil passage 64.

The auxiliary drive control section 41 drives the first pump 61 until the time that has elapsed since starting of the first pump 61 reaches the set drive time TD that is decided in this manner. After the elapse of the set drive time TD, the auxiliary drive control section 41 stops the first pump 61 and starts the second pump 62. The auxiliary drive control is terminated in response to starting of the second pump 62.

The rotational speed of the second rotating electrical machine 18 after the auxiliary drive control is controlled so as to follow a second target rotational speed that is set by the target rotational speed setting section 41b. The target rotational speed setting section 41b sets the second target rotational speed in view of output characteristics of the second rotating electrical machine 18. The target rotational speed setting section 41b sets the second target rotational speed to, e.g., a fixed value included in a rotational speed range in which the oil pressure required to bring the starting engagement device CLs into the direct-coupling engaged state can be secured. After the elapse of the set drive time TD, the second pump 62 is driven by the second rotating electrical machine 18 that is driven according to the set second target rotational speed. Thus, even when the vehicle is in the stopped state, the direct-coupling engaged state of the starting engagement device CLs is implemented by oil that is supplied from the second pump 62, whereby the first speed is formed. Accordingly, if an accelerator operation etc. is performed thereafter, the vehicle can be quickly started while satisfying the requested driving force.

Particularly in the present embodiment, in the auxiliary drive control, the first pump 61 having higher discharge capability than the second pump 62 can be used to promptly discharge air present in the first oil passage 63 and replace the air with oil. In particular, air present in the first oil passage 63 can be promptly discharged and replaced with oil even in a situation where the oil temperature is equal to or lower than the low temperature determination threshold LT and the viscosity resistance of oil is high. At this time, the first pump 61 is driven for the set drive time TD that is appropriately decided based on the capacity of the common oil passage portion 63c and also based on the rotational speed of the first rotating electrical machine 12 and the oil temperature. Accordingly, the entire common oil passage portion 63c and at least part of the second oil passage 64 can be filled with oil, and the time during which the relatively high output first rotating electrical machine 12 is driven can be reduced to a relatively short time.

After the elapse of the set drive time TD, at least part of the second oil passage 64 on the first oil passage 63 side is full of oil, and the remaining part on the second pump 62 side where air remains is in a reduced pressure state. This can reduce a load on the second rotating electrical machine 18 as a power source upon starting of the second pump 62. This eliminates the need to use the second rotating electrical machine 18 having a large physical size, and can thus suppress an increase in cost and size of the drive device 1. Since air remaining in the second oil passage 64 can be discharged more promptly, oil can be promptly supplied to the starting engagement device CLs by the second pump 62. That is, the direct-coupling engaged state of the starting engagement device CLs can be promptly implemented, and the state where the vehicle can be quickly started while satisfying the requested driving force can be promptly implemented. Moreover, such a state can be implemented by driving the relatively low output second rotating electrical machine 18. This can suppress reduction in fuel economy while allowing the vehicle to be quickly started while satisfying the requested driving force.

In a situation where the oil temperature is higher than the warm-up determination threshold WT and equal to or lower than the low temperature determination threshold LT, the warm-up operation control is not executed, and therefore a prompt increase in oil temperature and prompt reduction in viscosity resistance due to the warm-up operation cannot be expected. Accordingly, the above auxiliary drive control is very effective. Even in a situation where the oil temperature is equal to or lower than the warm-up determination threshold WT, components in the speed change mechanism 13 do not rotate if the warm-up operation control is executed with the first engagement device CL1 being in the disengaged state and the first rotating electrical machine 12 being in the stopped state, because the intermediate shaft M does not rotate. Accordingly, even if the internal combustion engine 11 is driven for warm-up, a prompt increase in oil temperature and prompt reduction in viscosity resistance cannot be expected for the oil (automatic transmission fluid: ATF) in the speed change mechanism 13. Therefore, the above auxiliary drive control is very effective in this case as well.

As shown in FIG. 4, the control device 3 according to the present embodiment further includes an acceptance prohibition control section 43. The acceptance prohibition control section 43 is a function unit that prohibits acceptance of a change from the stop mode to the drive mode until the set drive time TD elapses after the main power supply of the vehicle is turned on. The shift lever is normally at the parking position when the main power supply of the vehicle is switched from off to on. In the configuration in which the mode command accepting section 31 accepts selection of the mode based on the position of the shift lever as in the present embodiment, the acceptance prohibition control section 43 fixes, e.g., the shift lever to the parking position until the set drive time TD elapses. The acceptance prohibition control section 43 releases the shift lever from the fixed position after the elapse of the set drive time TD. The present embodiment may be configured so that the shift lever is allowed to be shifted only to the neutral position until the set drive time TD elapses, and is allowed to be shifted to all the positions after the elapse of the set drive time TD.

Acceptance of a mode change from the stop mode to the drive mode is thus prohibited if the set drive time TD has not elapsed and thus the auxiliary drive control has not been completed and conditions that oil can be promptly supplied to the starting engagement device CLs have not been satisfied. This can suppress occurrence of a situation where the vehicle actually cannot be immediately and appropriately caused to travel even though the mode is changed to the drive mode by the driver of the vehicle. After the elapse of the set drive time TD, the auxiliary drive control is completed, and oil can be promptly supplied to the starting engagement device CLs. Acceptance of a mode change from the stop mode to the drive mode is therefore permitted. Accordingly, the vehicle can be quickly started when an accelerator operation etc. is performed by the driver of the vehicle. This can give the driver of the vehicle a comfortable operational feel without causing discomfort.

1-4. Processing Procedures of Start Control Process

Figure 6:
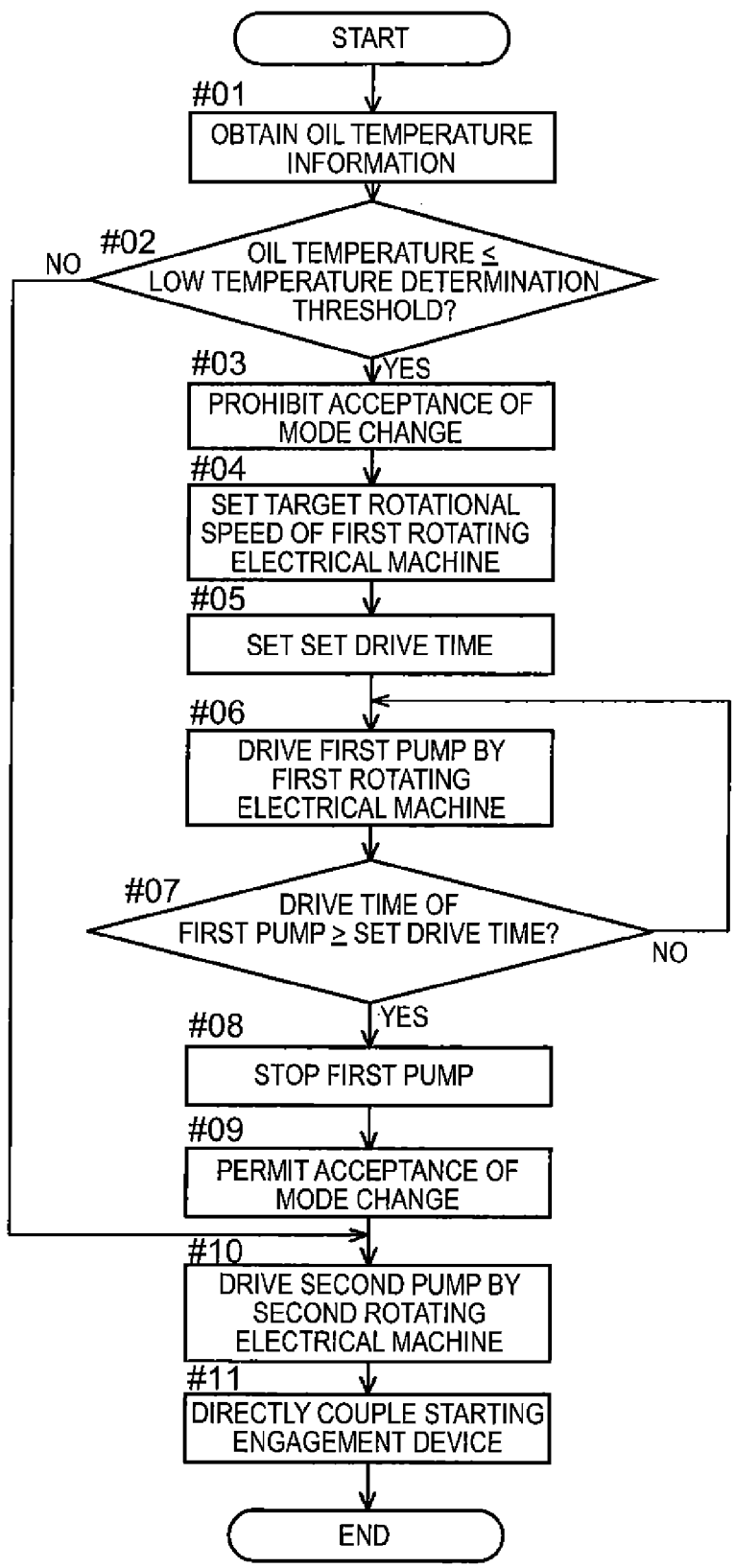
FIG. 6 is a flowchart showing processing procedures of a start control process according to a first embodiment.

Processing procedures of a start control process including the auxiliary drive control according to the present embodiment will be described with reference to FIGS. 6 and 7. The flowchart of FIG. 6 shows a process to be performed after the main power supply of the vehicle is turned on. The timing chart of FIG. 7 shows an example of the operating state of each part in the case where the oil temperature is low, and a black triangle shows that the main power supply of the vehicle is turned on.

The start control process is started when the main power supply of the vehicle is turned on at time T01. Information on oil temperature is first obtained from the oil temperature sensor Se5 (step #01). The low oil temperature determining section 41a determines whether or not the obtained oil temperature is equal or lower than the low temperature determination threshold LT (#02). If the oil temperature is higher than the low temperature determination threshold LT (#02: No), the second pump 62 is immediately driven by the second rotating electrical machine 18 according to the normal specification (#10). Then, if a sufficient oil pressure starts to be generated by the second pump 62, the starting engagement device CLs is brought into the direct-coupling engaged state (#11), and the start control process is terminated.

If the oil temperature is equal to or lower than the low temperature determination threshold LT (#02: Yes), the acceptance prohibition control section 43 prohibits acceptance of a change from the stop mode to the drive mode (#03). The auxiliary drive control that is specific to the present application is executed in this state. In the auxiliary drive control, the target rotational speed setting section 41b sets the target rotational speed of the first rotating electrical machine 12 (the first target rotational speed) during execution of the auxiliary drive control (#04). In the present embodiment, the target rotational speed of the first rotating electrical machine 12 during execution of the auxiliary drive control is set to the fixed value in view of the output characteristics of the first rotating electrical machine 12, quietness before starting of the vehicle, etc. Based on the information on the set first target rotational speed and the oil temperature obtained in step #01, the drive time deciding section 42 decides the set drive time TD by referring to the set drive time defining map (#05).

Figure 7:
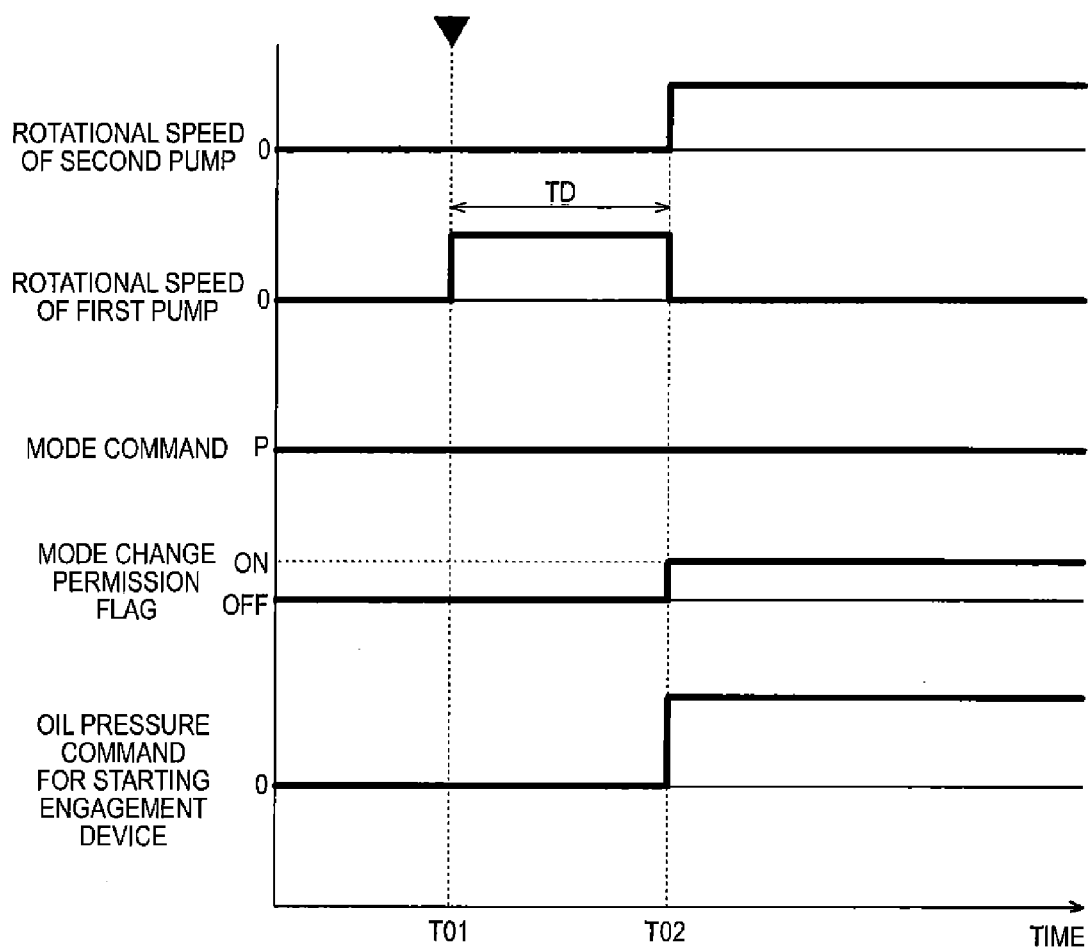
FIG. 7 is a timing chart showing an example of an operating state of each part according to the start control process.

In the auxiliary drive control, with the second rotating electrical machine 18 and the second pump 62 being kept in the stopped state, the auxiliary drive control section 41 drives the first pump 61 by the first rotating electrical machine 12 from time T01 when the main power supply is turned on in FIG. 7 (#06). While the first pump 61 is being driven, the auxiliary drive control section 41 determines if the time that has elapsed since starting of the first pump 61 (first pump drive time) has reached the set drive time TD set in step #05 (#07). The first pump 61 is continuously driven until the set drive time TD elapses (#07: No). If the set drive time TD elapses at time T02 (#07: Yes), the auxiliary drive control section 41 stops the first pump 61 (#08). The acceptance prohibition control section 43 permits acceptance of a change from the stop mode to the drive mode (#09).

Then, the drive time deciding section 42 drives the second pump 62 by the second rotating electrical machine 18 from time T02 when the set drive time TD has elapsed (#10), and the auxiliary drive control is terminated. In the present embodiment, a sufficient oil pressure quickly starts to be generated by the second pump 62 by executing the auxiliary drive control. Accordingly, the starting engagement device CLs is immediately brought into the direct-coupling engaged state at time T02 (#11), and the start control process is terminated.

2. Second Embodiment

A second embodiment of the control device according to the present invention will be described with reference to the drawings. In the present embodiment, the control device 3 does not include the acceptance prohibition control section 43. The present embodiment is therefore different from the first embodiment in that acceptance of a mode change is permitted even if the auxiliary drive control has not been completed and the conditions that oil can be promptly supplied to the starting engagement device CLs have not been satisfied. The differences from the first embodiment will be mainly described below. The present embodiment is similar to the first embodiment unless otherwise specified.

2-1. Configuration of Control Device

In the present embodiment, the drive time deciding section 42 decides the set drive time TD based on not only the capacity of the common oil passage portion 63c but also the overall capacity of the first oil passage 63. The drive time deciding section 42 decides the set drive time TD so that the entire first oil passage 63 including the common oil passage portion 63c can be filled with oil. The first pump 61 has high discharge capability. Accordingly, in the case where the set drive time TD is set in this manner, oil discharged from the first pump 61 can be supplied to the hydraulic control device 28 even before the set drive time TD has elapsed. Therefore, even if the drive mode is selected before the set drive time TD has elapsed, oil discharged from the first pump 61 can bring the starting engagement device CLs into the state where the starting engagement device CLs can transmit torque.

More specifically, in the case where the drive mode is selected before the set drive time TD has elapsed, the oil pressure control section 36 controls an oil pressure command for the starting engagement device CLs so as to shift the starting engagement device CLs from the disengaged state to the slip engaged state. In the present embodiment, the oil pressure control section 36 controls the oil pressure command for the starting engagement device CLs so that the torque that is transferred via the starting engagement device CLs becomes equal to a value corresponding to creep torque. Thus, intention of the driver of the vehicle is prioritized, and the state where the vehicle can travel (the state where the vehicle can creep) can be implemented even if the set drive time TD has not elapsed and the auxiliary drive control has not been fully completed.

In this case, the starting engagement device CLs that is brought into the slip engaged state generates heat in proportion to the differential rotational speed between the two engagement members that are engaged with each other, under conditions that transferred torque is constant. Before the vehicle is started, the rotational speed of the engagement member on the output shaft O side of the starting engagement device CLs is zero, and therefore the differential rotational speed is determined in proportion to the rotational speed of the first rotating electrical machine 12. That is, the amount of heat generation of the starting engagement device CLs depends on the rotational speed of the first rotating electrical machine 12. The temperature of the starting engagement device CLs increases as the heat is generated by the starting engagement device CLs.

Accordingly, in the present embodiment, the target rotational speed setting section 41b decides the first target rotational speed based on an estimated amount of heat generation or estimated temperature of the starting engagement device CLs in addition to the output characteristics of the first rotating electrical machine 12 and quietness before starting of the vehicle at the time the main power supply of the vehicle is turned on. The estimated amount of heat generation of the starting engagement device CLs is calculated in proportion to the product of the transferred torque and the differential rotational speed between the two engagement members. The estimated temperature of the starting engagement device CLs is calculated by integrating the estimated amount of heat generation and in view of cooling capability, heat dissipation capability, etc. The target rotational speed setting section 41b decides the first target rotational speed so that the estimated amount of heat generation and the estimated temperature of the starting engagement device CLs become equal to or lower than respective reference values that are set in view of thermal protection, under conditions that, e.g., the transferred torque is constant (the value corresponding to the creep torque).

The drive time deciding section 42 decides the set drive time TD according to the rotational speed of the first rotating electrical machine 12 (the first target rotational speed that is set by the target rotational speed setting section 41b). The present embodiment is similar to the first embodiment in this respect, and the drive time deciding section 42 decides the set drive time TD based on the first target rotational speed and the oil temperature by referring to the set drive time defining map.

After the elapse of the set drive time TD that is set in this manner, the common oil passage portion 63c and at least part of the second oil passage 64 are filled with oil in the present embodiment as well. Thus, as in the first embodiment, air remaining in the second oil passage 64 can be discharged more promptly, and oil can be promptly supplied to the starting engagement device CLs by the second pump 62. That is, the direct-coupling engaged state of the starting engagement device CLs can be promptly implemented, and the state where the vehicle can be quickly started while satisfying the requested driving force can be promptly implemented.

If the second pump 62 is started after the elapse of the set drive time TD and a required oil pressure starts to be generated, the oil pressure control section 36 controls the oil pressure command for the starting engagement device CLs so as to shift the starting engagement device CLs from the slip engaged state to the direct-coupling engaged state. In the present embodiment, the oil pressure control section 36 controls the oil pressure command for the starting engagement device CLs so that the oil pressure that is supplied to the starting engagement device CLs becomes larger than the engagement boundary pressure. The starting engagement device CLs is thus shifted to the direct-coupling engaged state. By maintaining this state, the vehicle can be immediately accelerated according to a subsequent acceleration operation etc.

2-2. Processing Procedures of Start Control Process

Figure 8:
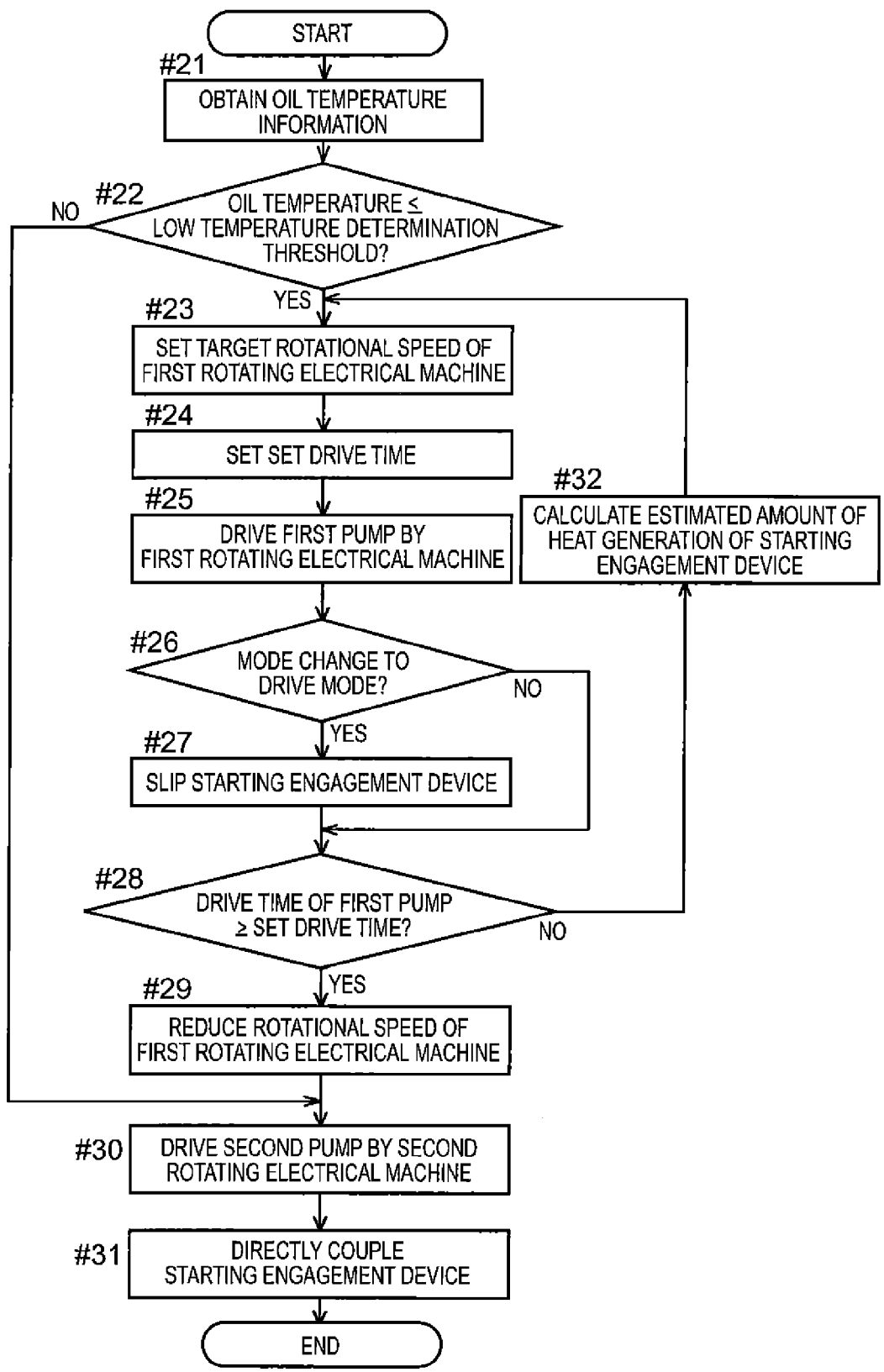
FIG. 8 is a flowchart showing processing procedures of a start control process according to a second embodiment.

Processing procedures of a start control process including the auxiliary drive control according to the present embodiment will be described with reference to FIGS. 8 to 10. Description in these figures is similar to that in FIGS. 6 and 7 in the first embodiment. Processing in steps #21, #22, #30, #31 in FIG. 8 is the same as that in steps #01, #02, #10, #11 in FIG. 6, respectively.

If the oil temperature is equal to or lower than the low temperature determination threshold LT (#22: Yes), the auxiliary drive control specific to the present application is executed with acceptance of a change to the drive mode being always permitted (see also FIGS. 9 and 10). In the auxiliary drive control, the target rotational speed setting section 41b sets the target rotational speed of the first rotating electrical machine 12 (the first target rotational speed) during execution of the auxiliary drive control (#23). In the present embodiment, the target rotational speed of the first rotating electrical machine 12 during execution of the auxiliary drive control is set to a variable value taking the estimated amount of heat generation or the estimated temperature of the starting engagement device CLs into consideration. Based on the information on the set first target rotational speed and the oil temperature obtained in step #21, the drive time deciding section 42 decides the set drive time TD by referring to the set drive time defining map (#24).

Figure 9:
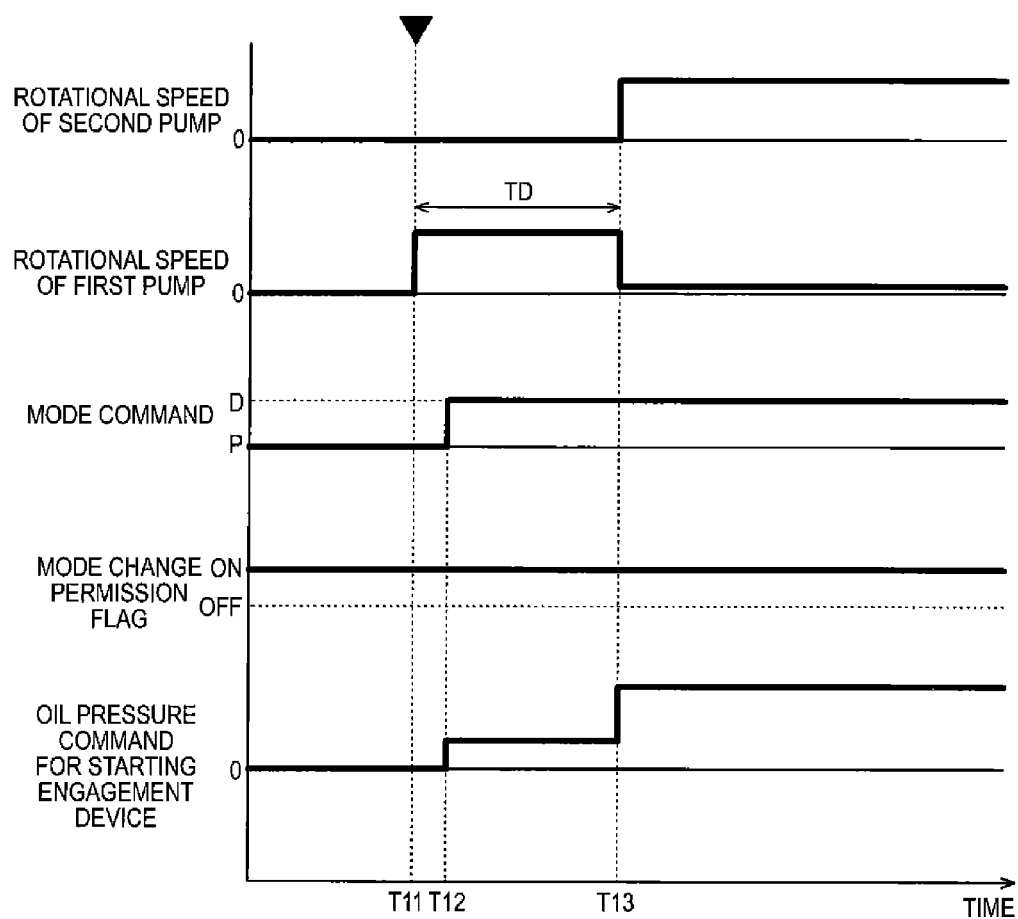
FIG. 9 is a timing chart showing an example of an operating state of each part according to the start control process.
Figure 10:
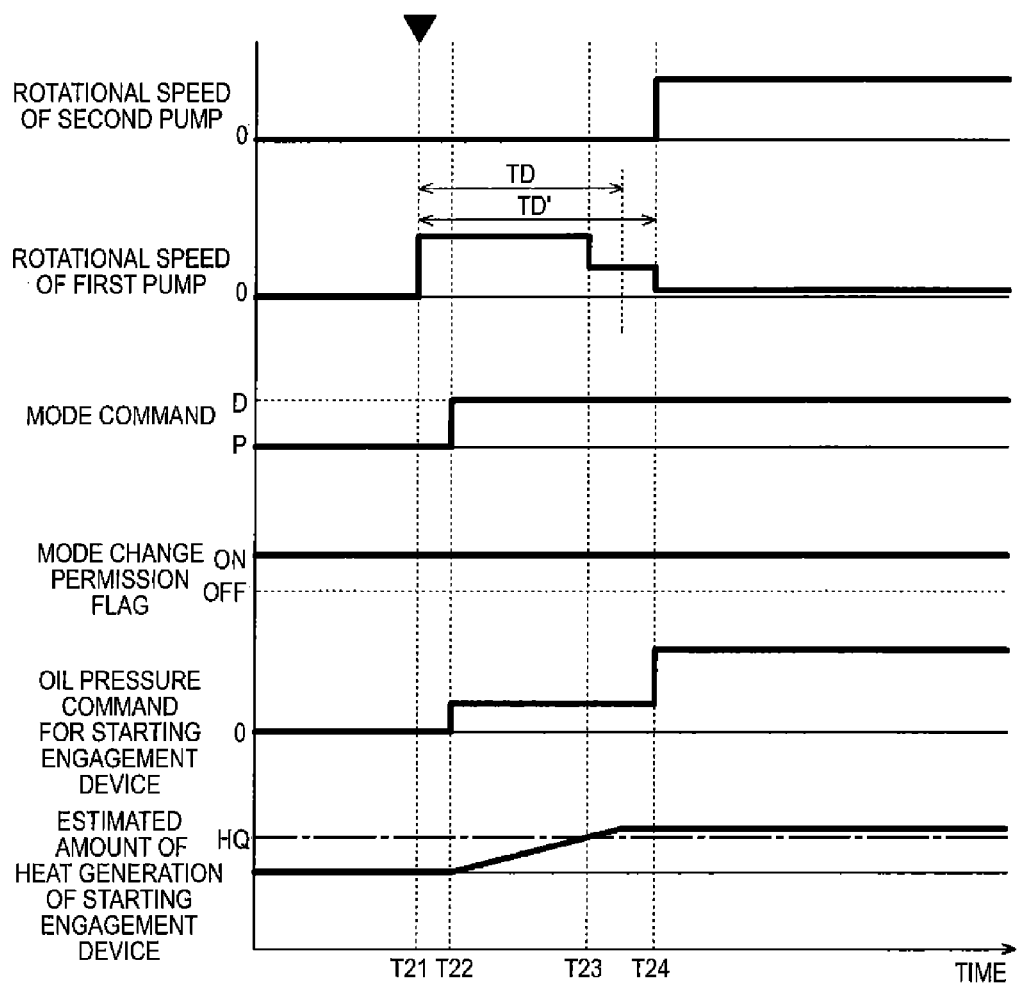
FIG. 10 is a timing chart showing an example of an operating state of each part according to the start control process.

In the auxiliary drive control, with the second rotating electrical machine 18 and the second pump 62 being kept in the stopped state, the auxiliary drive control section 41 drives the first pump 61 by the first rotating electrical machine 12 from time T11, T21 when the main power supply is turned on in FIGS. 9 and 10 (#25). While the first pump 61 is being driven, the mode command accepting section 31 determines if a mode change to the drive mode has been accepted (#26). If the mode change to the drive mode is accepted at time T12, T22 (#26: Yes), the oil pressure control section 36 shifts the starting engagement device CLs from the disengaged state to the slip engaged state (#27). Meanwhile, the auxiliary drive control section 41 determines if the time that has elapsed since starting of the first pump 61 (first pump drive time) has reached the set drive time TD set in step #24 (#28). Processing of steps #23 to #28 is repeatedly performed and the first pump 61 is continuously driven until the set drive time TD elapses (#28: No). If the set drive time TD elapses at time T13 in FIG. 9 (#28: Yes), the auxiliary drive control section 41 drives the first rotating electrical machine 12 at a rotational speed lower than the first target rotational speed (#29).

The rotational speed of the first rotating electrical machine 12 in this case is set in a rotational speed range that is required to output creep torque. This rotational speed is set to a value that is significantly lower than the first target rotational speed for driving the first pump 61. Accordingly, after the elapse of the set drive time TD, the discharge rate of the first pump 61 that is followingly driven by the first rotating electrical machine 12 rotating at such a low rotational speed is reduced to a negligibly small value as compared to the discharge rate of the second pump 62. Therefore, depending on the rotational speed of the first rotating electrical machine 12, the first pump 61 can be regarded as being substantially stopped in relation to the second pump 62, in terms of the oil discharge rate.

In the present embodiment, the target rotational speed setting section 41b continually calculates the estimated amount of heat generation of the starting engagement device CLs before the set drive time TD has elapsed (#32). Based on the calculated estimated amount of heat generation, the target rotational speed setting section 41b resets the target rotational speed of the first rotating electrical machine 12 (the first target rotational speed) (#23). Although not shown in detail in the figures, in the present embodiment, the target rotational speed setting section 41b maintains the set value of the first target rotational speed while the calculated estimated amount of heat generation is smaller than a high heat generation threshold HQ that is set in advance in view of thermal durability of the starting engagement device CLs. If the estimated amount of heat generation becomes equal to or higher than the high heat generation threshold HQ at time T23 in FIG. 10, the target rotational speed setting section 41b reduces the set value of the first target rotational speed. For example, the target rotational speed setting section 41b resets the first target rotational speed to, e.g., ⅓ to ½ of the set value that has been used. This can reduce the differential rotational speed between the two engagement members that are engaged with each other in the starting engagement device CLs, and can suppress further heat generation of the starting engagement device CLs. The amount of heat generation and the temperature of the starting engagement device CLs can thus be maintained within a proper range by feedback.

As the first target rotational speed decreases, the rate at which oil in the first oil passage 63 is sucked by driving the first pump 61 decreases accordingly. Therefore, if the first target rotational speed is reset in step #23, the drive time deciding section 42 also resets the set drive time TD according to the reset first target rotational speed (#24). Specifically, the drive time deciding section 42 resets the set drive time TD that has been used to a corrected set drive time TD' that is longer than the set drive time TD (see FIG. 10), according to the decrease in the first target rotational speed. The first pump 61 is continuously driven until the corrected set drive time TD' elapses (#28: No). After the elapse of the corrected set drive time TD' at time T24 in FIG. 10 (#28: Yes), the auxiliary drive control section 41 drives the first rotating electrical machine 12 at a rotational speed lower than the reset first target rotational speed (#29).

Then, the drive time deciding section 42 drives the second pump 62 by the second rotating electrical machine 18 from time T13, T24 when the set drive time TD (a concept including the corrected set drive time TD') has elapsed (#30), and the auxiliary drive control is terminated. In the present embodiment, a sufficient oil pressure quickly starts to be generated by the second pump 62 by executing the auxiliary drive control. Accordingly, the starting engagement device CLs is immediately brought into the direct-coupling engaged state at time T13, T24 (#31), and the start control process is terminated.

3. Other Embodiments

Lastly, other embodiments of the control device according to the present invention will be described. Configurations disclosed in each of the following embodiments can be combined with those disclosed in other embodiments as appropriate unless inconsistency arises.

(1) Each of the above embodiments is described with respect to an example in which the drive time deciding section 42 decides the set drive time TD so that the common oil passage portion 63c or the first oil passage 63 and at least part of the second oil passage 64 can be filled with oil. However, embodiments of the present invention are not limited to this. For example, the drive time deciding section 42 may decide the set drive time TD so that the common oil passage portion 63c and a predetermined proportion or more (e.g., 50% or more, 75% or more, 90% or more, etc.) of the second oil passage 64 can be filled with oil. The drive time deciding section 42 may decide the set drive time TD so that the common oil passage portion 63c and the entire second oil passage 64 can be filled with oil. The drive time deciding section 42 may decide the set drive time TD so that the entire first oil passage 63 and the entire second oil passage 64 can be filled with oil. Alternatively, the drive time deciding section 42 may decide the set drive time TD as an exact amount of time required to fill the entire first oil passage 63 and the entire second oil passage 64 with oil. In these cases, the set drive time TD can be experimentally obtained in advance according also to the rotational speed of the first rotating electrical machine 12 and the oil temperature.

(2) Each of the above embodiments is described with respect to an example in which the auxiliary drive control section 41 executes the auxiliary drive control on the condition that the oil temperature is equal to or lower than the predetermined low temperature determination threshold LT. However, embodiments of the present invention are not limited to this. The auxiliary drive control section 41 may execute the auxiliary drive control independently of the oil temperature. In this case, the set drive time TD may always be set to zero if the oil temperature is higher than the low temperature determination threshold LT.

(3) Each of the above embodiments is described with respect to an example in which the low temperature determination threshold LT is set to a value higher than the warm-up determination threshold WT. However, embodiments of the present invention are not limited to this. The low temperature determination threshold LT may be set to a value equal to the warm-up determination threshold WT, or the low temperature determination threshold LT may be set to a value lower than the warm-up determination threshold WT.

(4) Each of the above embodiments is described with respect to an example in which, in the case where the main power supply of the vehicle is turned on, the auxiliary drive control section 41 executes the auxiliary drive control without taking into consideration the time during which the main power supply of the vehicle had been off. However, embodiments of the present invention are not limited to this. For example, the auxiliary drive control section 41 may execute the auxiliary drive control on the condition that the main power supply of the vehicle had been off for at least a reference time that is predetermined as a time it takes for most of oil in the first oil passage 63 and the second oil passage 64 to flow out.

(5) Each of the above embodiments is described with respect to an example in which the starting engagement device CLs is brought into the direct-coupling engaged state immediately after the auxiliary drive control is completed. However, embodiments of the present invention are not limited to this. For example, an oil pressure higher than at least the engagement boundary pressure can be made to be generated by driving the second pump 62, and the oil pressure command for the starting engagement device CLs may be controlled so as to correspond to the disengagement boundary pressure. Even in such a configuration, the starting engagement device CLs can be quickly shifted to the direct-coupling engaged state and the first speed for starting of the vehicle can be promptly formed if an accelerator operation is performed subsequently. Thus, the vehicle can be quickly started while satisfying the requested driving force.

(6) The second embodiment is described with respect to an example in which the target rotational speed setting section 41b continually calculates the estimated amount of heat generation of the starting engagement device CLs before the set drive time TD has elapsed. However, embodiments of the present invention are not limited to this. The target rotational speed setting section 41b may continually calculate the estimated temperature of the starting engagement device CLs instead of the estimated amount of heat generation thereof. The target rotational speed setting section 41b may reset the target rotational speed of the first rotating electrical machine 12 (the first target rotational speed) based on the calculated estimated temperature. Alternatively, the target rotational speed setting section 41b may continually calculate both the estimated amount of heat generation and the estimated temperature, and may reset the first target rotational speed based on both the calculated estimated amount of heat generation and the calculated estimated temperature.

(7) The second embodiment is described with respect to an example in which the target rotational speed setting section 41b resets the first target rotational speed only if the estimated amount of heat generation becomes equal to or higher than the preset high heat generation threshold HQ. However, embodiments of the present invention are not limited to this. For example, the target rotational speed setting section 41b may continually change the first target rotational speed according to the calculated estimated amount of heat generation. In this case, the drive time deciding section 42 may dynamically set the set drive time TD according to the first target rotational speed that is continually changed.

(8) Each of the above embodiments is described with respect to an example in which the speed change mechanism 13 is provided with the one-way clutch, and when the vehicle is started, the first speed is formed with the second engagement device CL2 being in the direct-coupling engaged state and the one-way clutch being in the fixed state. However, embodiments of the present invention are not limited to this. For example, such a one-way clutch may not be provided, and the first speed may be formed with both the second engagement device CL2 and the third engagement device CL3 being in the direct-coupling engaged state. In order to bring the third engagement device CL3 into the direct-coupling engaged state, oil may be supplied also to the third engagement device CL3 in the auxiliary drive control. In this case, the third engagement device CL3 can also be handled as the "starting engagement device CLs" in addition to the second engagement device CL2. The third engagement device CL3 may be configured as a normally closed engagement device.

(9) Each of the above embodiments is described with respect to an example in which the mode command accepting section 31 accepts selection of the mode based on the position of the shift lever which is detected by the lever position sensor Se6. However, embodiments of the present invention are not limited to this. For example, the mode command accepting section 31 may accept selection of the mode based on an input operation to a button etc. provided as hardware or software. That is, any configuration may be employed as long as driver's intention to select a mode can be input to the control device 3.

(10) Each of the above embodiments is described with respect to an example in which the drive device 1 that is controlled by the control device 3 has the configuration shown in FIG. 1. However, embodiments of the present invention are not limited to this. The drive device 1 may have any specific configuration as long as the first rotating electrical machine 12 and the speed change mechanism 13 are provided on the power transmission path P connecting the internal combustion engine 11 and the wheels 15. For example, the drive device 1 may include, between the first rotating electrical machine 12 and the speed change mechanism 13 on the power transmission path P, a fluid coupling (e.g., a torque converter etc.) having a fastening engagement device. The drive device 1 may include a dedicated transmission engagement device at any position between the first rotating electrical machine 12 and the differential gear unit 14 on the power transmission path P.

(11) Each of the above embodiments is described with respect to an example in which the control device 3 includes the function units 31 to 43. However, embodiments of the present invention are not limited to this. The assignment of the function units described above is by way of example only. A plurality of function units may be combined, and a single function unit may be subdivided.

(12) Regarding other configurations as well, the embodiments disclosed in the specification are by way of example only in all respects, and embodiments of the present invention are not limited to them. That is, those configurations which are not described in the claims of the present application may be modified as appropriate without departing from the object of the present invention.

INDUSTRIAL APPLICABILITY

The present invention can be used in control devices that control a vehicle drive device including a first pump and a second pump which can be driven independently of each other.

DESCRIPTION OF THE REFERENCE NUMERALS

1: Drive Device (Vehicle Drive Device)
3: Control Device
6: Oil Supply Portion
11: Internal Combustion Engine
12: First Rotating Electrical Machine
13: Speed Change Mechanism
15: Wheel
18: Second Rotating Electrical Machine
31: Mode Command Accepting Section
36: Oil Pressure Control Section (Engagement Control Section)
41: Auxiliary Drive Control Section
41a: Low Oil Temperature Determining Section
41b: Target Rotation Time Setting Section
42: Drive Time Deciding Section
43: Acceptance Prohibition Control Section
61: First Pump
62: Second Pump
63: First Oil Passage
63c: Common Oil Passage Portion
64: Second Oil Passage
67: Open End
68: Branch Point
CLs: Starting Engagement Device
TD: Set Drive Time
LT: Low Temperature Determination Threshold
V: Vertical Direction

The invention claimed is:

1. A control device that controls a vehicle drive device in which a first rotating electrical machine and a speed change mechanism are provided on a power transmission path connecting an internal combustion engine and wheels, which includes a first pump that is driven by the first rotating electrical machine and a second pump that is driven by a second rotating electrical machine provided independently of the power transmission path, and which further includes an oil supply portion that has a first oil passage in which oil to be supplied to the first pump flows and a second oil passage which branches off from the first oil passage and in which oil to be supplied to the second pump flows, and that is capable of supplying both oil discharged from the first pump and oil discharged from the second pump to at least the speed change mechanism, the control device comprising:

an auxiliary drive control section that, when a main power supply of a vehicle is turned on, executes auxiliary drive control of driving the first pump for a set drive time by the first rotating electrical machine before driving the second pump by the second rotating electrical machine, and starting the second pump after elapse of the set drive time;

a drive time deciding section that decides, based on capacity of a common oil passage portion as a portion extending from an open end located on an opposite side of the first oil passage from the first pump to a branch point to the second oil passage, the set drive time so that the common oil passage portion and at least part of the second oil passage can be filled with oil;

a mode command accepting section configured to accept selection of one of a drive mode in which the vehicle is allowed to travel and a stop mode in which the vehicle is not allowed to travel; and an engagement control section that controls an engagement state of a starting engagement device included in the speed change mechanism, wherein the engagement control section shifts the starting engagement device from a disengaged state to a slip engaged state if a change from the stop mode to the drive mode is accepted before the set drive time has elapsed, and shifts the starting engagement device to a direct-coupling engaged state after the elapse of the set drive time.

2. The control device according to claim 1, wherein the drive time deciding section decides the set drive time based also on an oil temperature and a rotational speed of the first rotating electrical machine during the auxiliary drive control.

3. The control device according to claim 2, wherein
the auxiliary drive control section is configured to stop the first pump after the elapse of the set drive time.

4. The control device according to claim 1, wherein
the auxiliary drive control section is configured to stop the first pump after the elapse of the set drive time.

5. The control device according to claim 1, wherein
the auxiliary drive control section decides a target rotational speed of the first rotating electrical machine during the auxiliary drive control based on an estimated amount of heat generation or an estimated temperature of the starting engagement device, and
the drive time deciding section changes the set drive time according to the target rotational speed.

6. The control device according to claim 1, wherein
the auxiliary drive control section executes the auxiliary drive control on a condition that the oil temperature is equal to or lower than a predetermined low temperature determination threshold.

* * * * *